(12) United States Patent
Tomosugi

(10) Patent No.: US 11,695,705 B2
(45) Date of Patent: Jul. 4, 2023

(54) RESOURCE MANAGEMENT APPARATUS, RESOURCE MANAGEMENT SYSTEM, AND RESOURCE MANAGEMENT METHOD

(71) Applicant: Ryoh Tomosugi, Kanagawa (JP)

(72) Inventor: Ryoh Tomosugi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/672,684

(22) Filed: Feb. 16, 2022

(65) Prior Publication Data

US 2022/0286404 A1    Sep. 8, 2022

(30) Foreign Application Priority Data

Mar. 5, 2021   (JP) .................................. 2021-035851

(51) Int. Cl.
| | | |
|---|---|---|
| *H04L 47/72* | (2022.01) | |
| *H04L 47/80* | (2022.01) | |
| *H04L 47/70* | (2022.01) | |
| *G06K 19/06* | (2006.01) | |

(52) U.S. Cl.
CPC ............ *H04L 47/72* (2013.01); *H04L 47/805* (2013.01); *H04L 47/822* (2013.01); *H04L 47/824* (2013.01); *G06K 19/06* (2013.01)

(58) Field of Classification Search
CPC ..... H04L 47/72; H04L 47/805; H04L 47/822; H04L 47/824
See application file for complete search history.

(56) References Cited

U.S. PATENT DOCUMENTS

| | | | | |
|---|---|---|---|---|
| 2006/0015376 A1* | 1/2006 | Sattler | .................. | G06Q 10/109 |
| | | | | 705/5 |
| 2009/0100435 A1* | 4/2009 | Papaefstathiou | ..... | G06F 9/5011 |
| | | | | 718/104 |
| 2015/0081470 A1* | 3/2015 | Westphal | ........... | G06Q 30/0631 |
| | | | | 705/26.7 |
| 2018/0096323 A1* | 4/2018 | Baber | ................. | G06Q 20/4012 |
| 2018/0126222 A1* | 5/2018 | Duale | ..................... | G06Q 10/02 |
| 2018/0285820 A1* | 10/2018 | Vendrow | .............. | G06Q 10/109 |
| 2020/0104804 A1 | 4/2020 | Fujimura et al. | | |
| 2020/0143305 A1* | 5/2020 | Mund | ..................... | G06Q 10/02 |
| 2020/0242670 A1* | 7/2020 | Thye | ...................... | H04L 47/822 |
| 2021/0035074 A1* | 2/2021 | Alieiev | ................ | G06Q 50/188 |
| 2021/0150423 A1 | 5/2021 | Tomosugi et al. | | |
| 2021/0174268 A1* | 6/2021 | Levinson | ................ | G06Q 10/02 |
| 2021/0256481 A1* | 8/2021 | Suzuki | ................... | G06Q 10/02 |

FOREIGN PATENT DOCUMENTS

| | | |
|---|---|---|
| JP | 2005-018369 A | 1/2005 |
| JP | 2019-144918 | 8/2019 |
| JP | 2020-038552 | 3/2020 |
| JP | 2020-095675 | 6/2020 |

OTHER PUBLICATIONS

Japanese Office Action dated Apr. 25, 2023 in corresponding Japanese Patent Application No. 2021-035851 (with machine-generated English translation), 7 pages.

* cited by examiner

*Primary Examiner* — Glenton B Burgess
*Assistant Examiner* — Jihad K Boustany
(74) *Attorney, Agent, or Firm* — Xsensus LLP

(57) ABSTRACT

A resource management apparatus, a resource management system, and a resource management method. The resource management apparatus stores in one or more memories, positional relation of a resource and reservation information related to a reservation of the resource, in response to receiving a usage start request for starting a use of the resource from a communication terminal, determines whether one or more resources in surroundings are secured based on the positional relation and the reservation information, identifies the resource as an available resource in response to a determination that the one or more resources in the surroundings are not secured, and transmits usage information regarding the use of the available resource to the communication terminal.

8 Claims, 20 Drawing Sheets

FIG. 6

DATE: FEBRUARY 1, 2021

| RESOURCE ID | RESOURCE NAME | FLOOR ID | FLOOR NAME | USAGE STATUS | POSITIONAL RELATION | NUMBER OF RESERVATIONS IN SURROUNDINGS |
|---|---|---|---|---|---|---|
| S-001 | SPACE 001, FIRST FLOOR BUILDING A | F-001 | FIRST FLOOR BUILDING A | IN USE | S-002(SIDE), S-005(DIAGONAL), S-006(OPPOSITE) | 1 |
| S-002 | SPACE 002, FIRST FLOOR BUILDING A | F-001 | FIRST FLOOR BUILDING A | RESERVED | S-001(SIDE), S-003(SIDE), S-004(DIAGONAL), S-005(OPPOSITE), S-006(DIAGONAL) | 2 |
| S-003 | SPACE 003, FIRST FLOOR BUILDING A | F-001 | FIRST FLOOR BUILDING A | RESERVED | S-002(SIDE), S-004(OPPOSITE), S-005(DIAGONAL) | 1 |
| S-004 | SPACE 004, FIRST FLOOR BUILDING A | F-001 | FIRST FLOOR BUILDING A | VACANT | S-002(DIAGONAL), S-003(OPPOSITE), S-005(SIDE) | 2 |

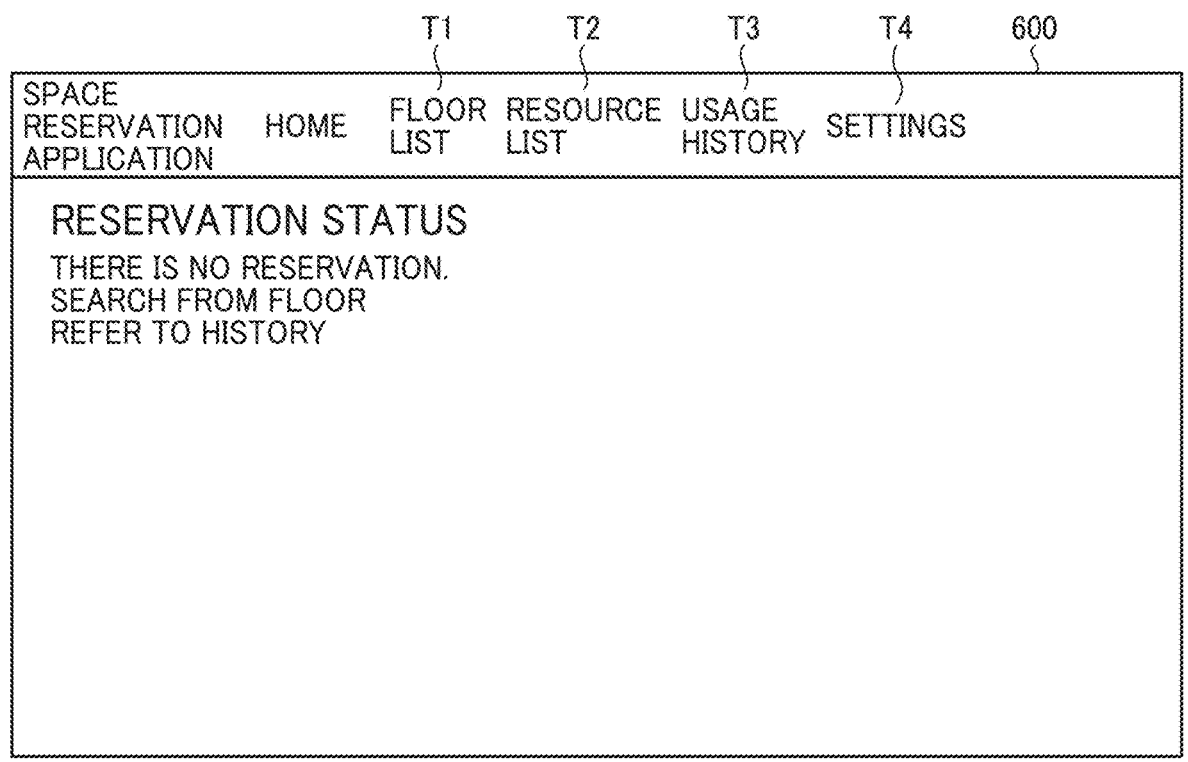

FIG. 13A

|  |  | | 652 |
|---|---|---|---|

| SPACE RESERVATION APPLICATION | HOME | FLOOR LIST | RESOURCE LIST | USAGE HISTORY | SETTINGS |
|---|---|---|---|---|---|

RESOURCE LIST                                UPDATE

| RESOURCE NAME | FLOOR NAME | | |
|---|---|---|---|
| SPACE 001, FIRST FLOOR, BUILDING A | FIRST FLOOR, BUILDING A | EDIT | DELETE |
| SPACE 002, FIRST FLOOR, BUILDING A | FIRST FLOOR, BUILDING A | EDIT | DELETE |
| SPACE 003, FIRST FLOOR, BUILDING A | FIRST FLOOR, BUILDING A | EDIT | DELETE |
| SPACE 004, FIRST FLOOR, BUILDING A | FIRST FLOOR, BUILDING A | EDIT | DELETE |
| SPACE 005, FIRST FLOOR, BUILDING A | FIRST FLOOR, BUILDING A | EDIT | DELETE |
| SPACE 006, FIRST FLOOR, BUILDING A | FIRST FLOOR, BUILDING A | EDIT | DELETE |
| SPACE 007, FIRST FLOOR, BUILDING A | FIRST FLOOR, BUILDING A | EDIT | DELETE |
| SPACE 008, FIRST FLOOR, BUILDING A | FIRST FLOOR, BUILDING A | EDIT | DELETE |

| SPACE RESERVATION APPLICATION | HOME | FLOOR LIST | RESOURCE LIST | USAGE HISTORY | SETTINGS |
|---|---|---|---|---|---|

RESOURCE NAME
SPACE 001, FIRST FLOOR, BUILDING A

RESOURCE ID
S-001

FLOOR
FIRST FLOOR, BUILDING A ▼

POSITIONAL RELATION
SPACE 002, FIRST FLOOR, BUILDING A ▼    SIDE ▼
SPACE 005, FIRST FLOOR, BUILDING A ▼    OPPOSITE ▼
SPACE 006, FIRST FLOOR, BUILDING A ▼    DIAGONAL ▼

+ ADD NEW SPACE

[ SAVE ]    [ CANCEL ]

FIG. 18

DATE: FEBRUARY 1, 2021

T — 5001

| RESOURCE ID | RESOURCE NAME | FLOOR ID | FLOOR NAME | USAGE STATUS | COORDINATES (X, Y) | NUMBER OF RESERVATIONS IN SURROUNDINGS |
|---|---|---|---|---|---|---|
| S-001 | SPACE 001, FIRST FLOOR BUILDING A | F-001 | FIRST FLOOR BUILDING A | IN USE | (100, 100) | 1 |
| S-002 | SPACE 002, FIRST FLOOR BUILDING A | F-001 | FIRST FLOOR BUILDING A | RESERVED | (200, 100) | 2 |
| S-003 | SPACE 003, FIRST FLOOR BUILDING A | F-001 | FIRST FLOOR BUILDING A | RESERVED | (300, 100) | 1 |
| S-004 | SPACE 004, FIRST FLOOR BUILDING A | F-001 | FIRST FLOOR BUILDING A | VACANT | (100, 200) | 2 |

| NUMBER OF RESERVATIONS IN SURROUNDINGS | DISTANCE |
|---|---|
| ONE OR LESS | 150 |

FIG. 20A

```
SPACE
RESERVATION   HOME   FLOOR   RESOURCE   USAGE    SETTINGS
APPLICATION           LIST    LIST       HISTORY
```

RESOURCE NAME
SPACE 004, FIRST FLOOR, BUILDING A

RESOURCE ID
S-004

FLOOR
FIRST FLOOR, BUILDING A

MAP COORDINATES
X: 200  Y: 100  [MODIFY]

[SAVE]  [CANCEL]

FIG. 20B

```
SPACE
RESERVATION   HOME   FLOOR   RESOURCE   USAGE    SETTINGS
APPLICATION           LIST    LIST       HISTORY
```

MAP COORDINATES (X,Y)=(200,100)  [SAVE]  [CANCEL]

RESOURCE MANAGEMENT APPARATUS, RESOURCE MANAGEMENT SYSTEM, AND RESOURCE MANAGEMENT METHOD

CROSS-REFERENCE TO RELATED APPLICATIONS

This patent application is based on and claims priority pursuant to 35 U.S.C. § 119(a) to Japanese Patent Application No. 2021-035851, filed on Mar. 5, 2021, in the Japan Patent Office, the entire disclosure of which is hereby incorporated by reference herein.

BACKGROUND

Technical Field

The present disclosure relates to a resource management apparatus, a resource management system, and a resource management method.

Related Art

In recent years, introduction of free address office system is expanding. In such a free address office system, a technique for encouraging users to vitalize communication and avoiding staying at the same address is known.

SUMMARY

Embodiments of the present disclosure describe a resource management apparatus, a resource management system, and a resource management method. The resource management apparatus stores in one or more memories, positional relation of a resource and reservation information related to a reservation of the resource, in response to receiving a usage start request for starting a use of the resource from a communication terminal, determines whether one or more resources in surroundings are secured based on the positional relation and the reservation information, identifies the resource as an available resource in response to a determination that the one or more resources in the surroundings are not secured, and transmits usage information regarding the use of the available resource to the communication terminal.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is a conceptual diagram illustrating an example of a resource information management table according to the embodiments of the present disclosure;

FIGS. 12A and 12B are diagrams illustrating examples of a management site screen according to the embodiments of the present disclosure;

FIGS. 13A and 13B are diagrams illustrating examples of the management site screen according to the embodiments of the present disclosure;

FIG. 18 is a conceptual diagram illustrating an example of the resource information management table according to a third embodiment of the present disclosure;

FIG. 19 is a conceptual diagram illustrating an example of the priority information management table according to the third embodiment of the present disclosure;

FIGS. 20A and 20B are diagrams illustrating examples of the management site screen according to the third embodiment of the present disclosure.

Figure 1:
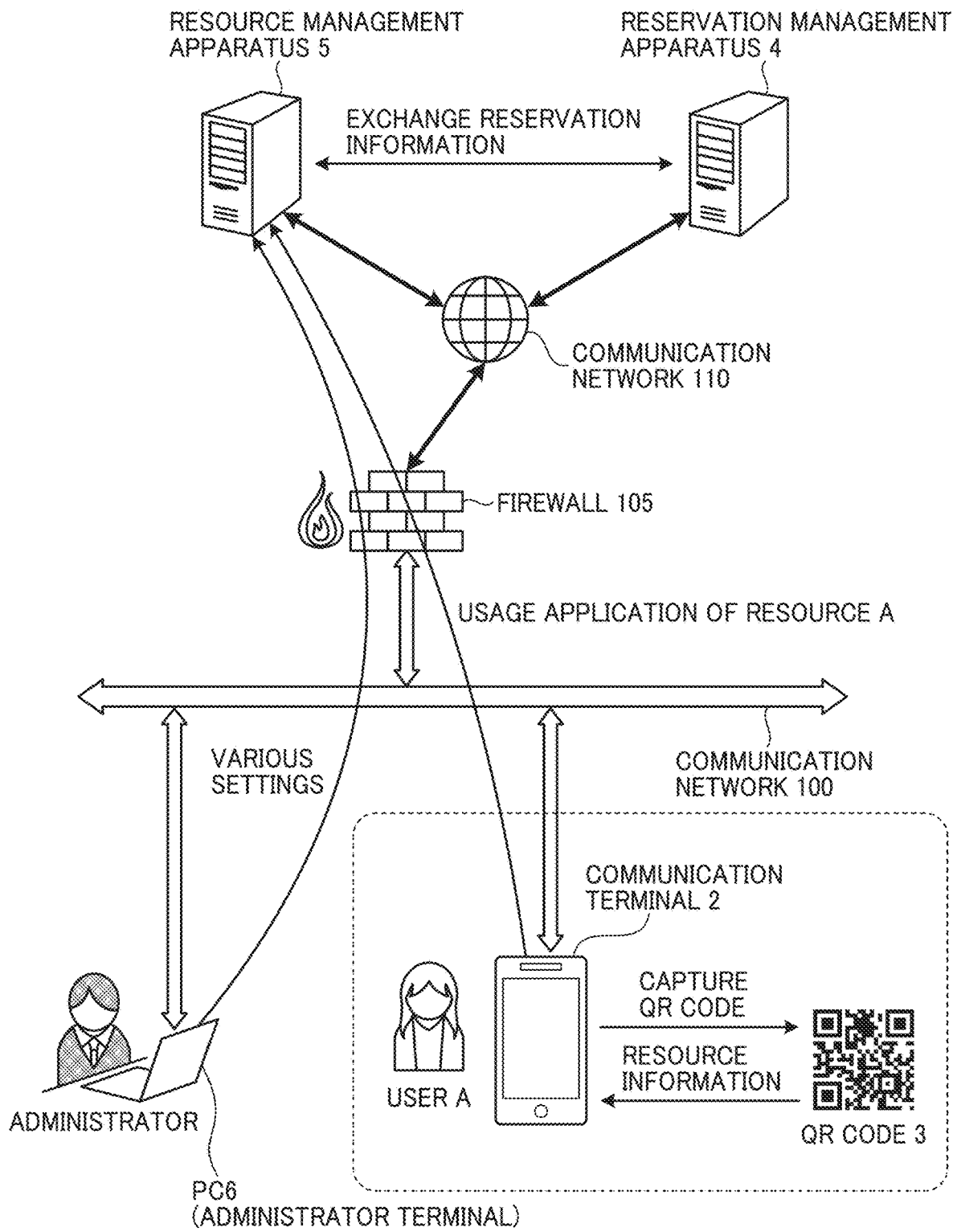
FIG. 1 is a schematic view illustrating an example of a configuration of a resource management system 1, according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described with reference to the drawings. In the description of the drawings, the same elements are denoted by the same reference numerals, and redundant descriptions thereof are omitted.

FIG. 1 is a schematic view illustrating an example of a configuration of a resource management system 1, according to a first embodiment of the present disclosure. In the present embodiment, the resource management system 1 includes a communication terminal 2, a reservation management apparatus 4, a resource management apparatus 5, and a PC 6.

The resource management apparatus 5 manages usage status of a resource (managed resource) such as a free address seat. The reservation management apparatus 4 manages reservation status of the resource and the like.

The communication terminal 2 and the PC 6 are connected to each other inside the firewall 105 through a communication network 100 such as an in-house network.

Further, the resource management apparatus 5 and the reservation management apparatus 4 are connected to each other through the communication network 110 on the outside of the firewall 105.

The communication network 110 is a network through which unidentified volume of communication is transmitted. Examples of the communication network 110 include the internet, a mobile communication network, a local area network (IAN), or the like. The resource management apparatus 5 communicates with the reservation management apparatus 4 through the communication network 110. Further, the resource management apparatus 5 communicates with the communication terminal 2 and the PC 6 through the communication network 110, the firewall 105, and the communication network 100. In addition, the reservation management apparatus 4 communicates with the communication terminal 2 and the PC 6 through the communication network 110, the firewall 105, and the communication network 100.

Examples of the communication network 110 may include, in addition to a wired communication, a wireless communication in compliance with, for example, 3rd Generation (3G), 4th Generation (4G), 5th Generation (5G), Worldwide Interoperability for Microwave Access (WiMAX), and Long Term Evolution (LTE).

The communication terminal 2 is installed with a general mobile terminal operating system (OS) or the like.

The communication terminal 2 is a communication terminal for a user to use a resource and make various settings after using the resource through a web page provided by the resource management apparatus 5.

In one example, dedicated application software (hereinafter referred to as an application) that operates with the resource management apparatus 5 is installed on the communication terminal 2. In the present embodiment, the user starts using the resource by operating the communication terminal 2 in which the application is installed.

The above-mentioned application may be substituted by browser software.

Further, the communication terminal 2 may be, for example, a communication terminal including a communication function such as a smartphone, a tablet terminal, a personal digital assistant (PDA), or a wearable PC (sunglasses type, wristwatch type, etc.). In other words, the communication terminal may be any terminal capable of executing software such as the browser software.

In the present embodiment, the communication terminal 2 functions as an example of the communication terminal.

The reservation management apparatus 4 is implemented by one or more information processing apparatuses (a computer system), each being installed with a general-purpose server OS.

A system related to resource reservation and user reservation or schedule management provided by the reservation management apparatus 4 is referred to as a reservation management system.

The reservation management apparatus 4 includes a calendar system and provides a web application for managing various schedules of a user. For example, the reservation management apparatus 4 includes following functions.

Accepting the user's reservation or schedule registration. The user can check his/her reservation status or schedule from anywhere at any time.

Transmitting a reminder email at a preset date and time to the user, such as 30 minutes before a scheduled time.

Enabling the user to manage reservations and schedules by using plural calendars (one for business, another one for family, etc.).

Sharing a calendar with other members who belong to the same group.

The reservation management apparatus 4 uses an account to manage the user. The account represents a right of the user to use a service. The account is used in many systems and a user of each system uses his or her account to log in the system. For this reason, the account includes a function to enable the system to uniquely identify the user (function of identification information).

In the present embodiment, the reservation management apparatus 4 transmits the reservation information of the account (domain) registered in advance to the resource management apparatus 5 that manages the free address seats, meeting rooms, and the like.

Alternatively, the resource management apparatus 5 may request the reservation information by designating the account of the reservation management apparatus 4 so that the resource management apparatus 5 can acquire the reservation information of the meeting room from the reservation management apparatus 4.

The account may be any suitable information that uniquely identifies a user. Examples of the account include an email address, an identifier (ID), and a telephone number.

In the present embodiment, the reservation management apparatus 4 manages information on reservations for various types of resources, which includes a free space and the meeting room, and information on scheduled events or user schedules. Although G SUITE (registered trademark), OFFICE 365 (registered trademark), and the like are known as the reservation management apparatus 4, any other suitable reservation management system including functions described in the present embodiment will suffice.

Further, in the present embodiment, the reservation management apparatus 4 registers in advance various resources reserved by each user and information related to the schedule of each user. That is, the web application of the reservation management apparatus 4 is customized based on an account of reservation-making user, resource ID, resource name, floor ID, floor name, start date and time, end date and time, etc. in the in-house network of the company that uses the resource management system 1. Accordingly, the reservation management apparatus 4 links the resources including each seat and each meeting room of the company with the reservation information, using the resource management system 1.

In the present embodiment, the reservation management apparatus 4 functions as an example of the reservation management apparatus.

The resource management apparatus 5 is implemented by one or more information processing apparatuses (the computer system), each being installed with the general-purpose server OS.

The resource management apparatus 5 acquires reservation information for each resource from the reservation management apparatus 4 through the communication network 110.

Further, the resource management apparatus 5 manages check-in and check-out to each seat and each meeting room through the communication network 100.

In the present embodiment, the resource management apparatus 5 functions as an example of the resource management apparatus.

Further, the information shared by the resource management apparatus 5 is not limited to text information and includes images, moving images, sounds and the like. However, in the present embodiment, for convenience of explanation, description is made with text information mainly used for the notification.

Similarly, the resource management apparatus 5 can manage users with an account different from the account of the reservation management apparatus 4, but it is not necessary that the resource management apparatus 5 described above to be aware of the account of the resource management apparatus 5 in principle. However, the resource management apparatus 5 can specify and notify an account of the resource management apparatus 5.

An administrator who manages the schedule of the user uses the PC 6 connected to the communication network 100 inside the firewall 105. The PC 6 is a communication terminal for the administrator to make various settings related to the resources through the web page provided by the resource management apparatus 5. The PC 6 makes initial settings as one of the various settings related to the resources. In place of the PC 6, a terminal device such as a smartphone that the administrator uses may be used for the initial settings. The PC 6 establishes wired or wireless communications. The PC 6 may further include a communication function using the browser software and displaying the web page on a display.

Alternative to the PC 6, for example, other communication terminals including communication capability, such as the tablet terminal, the PDA, or the wearable PC, which includes the sunglasses type and the wristwatch type, may be used. In other words, the communication terminal may be any terminal capable of executing software such as the browser software. In the present embodiment, the PC 6 functions as an example of an administrator terminal, which is a terminal used by the administrator.

The term "resource" refers to any resource owned, rented, or managed by a school, a company, a group, an organization, or the like. The resource of the school, the company, the group, the organization, or the like, includes for example, the meeting room and equipment. Further, a free space having a free address (hereinafter, simply referred to as a free space), a place such as a seat, a desk, a chair, a booth, a parking lot, a bicycle parking lot, etc. can be a resource. A resource that is difficult to move is called equipment. In the present embodiment, the term free space is used as an example of the resource for convenience of explanation. In addition, as an example of resources, various facilities such as a rental office, rental studio, accommodation facility such as hotel, entertainment venue, rental space, and space such as locker can be treated as a resource.

"Resource usage request" can be any usage request of a resource that requires identification information (resource ID). For example, a start of use or a start of reservation.

Further, a user includes a reservation-making user who has reserved the resource such as the free space or the meeting room, a participant who participates in the use of the resource, and the administrator who manages the resource management system 1 in the present embodiment. In a case in which the reservation-making user who reserved a certain resource uses the certain resource or participates in the use of the resource, the reservation-making user is the user or the participant of the certain resource.

Figure 2:
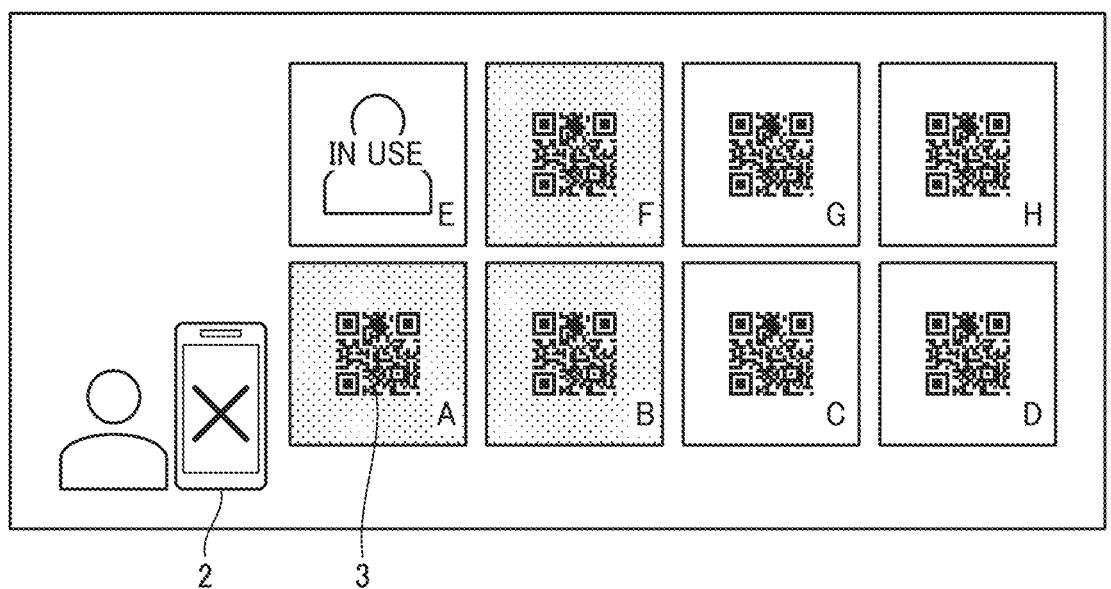
FIG. 2 is a diagram illustrating an example of outline of a process executed by a resource management system according to embodiments of the present disclosure.

FIG. 2 is a diagram illustrating an example of outline of a process executed by the resource management system 1. For example, a user takes a picture of a QUICK RESPONSE (QR) code (registered trademark) 3 attached to each seat using a camera function of the communication terminal 2 such as the smartphone in the office where the free address or the like is implemented. Accordingly, the user can reserve the seat and start using the seat.

In FIG. 2, the user takes the picture of the QR code 3 attached to a seat A, and the communication terminal 2 makes a request to the resource management apparatus 5 to start using the seat A based on the information read from the QR code 3. In response to receiving the request to start using the seat A, the resource management apparatus 5 identifies, for example, a seat C, a seat D, a seat G, and a seat H in which all the seats in the surroundings are not reserved. The seat A is not identified although the seat A is not used at the time when the request to start using the seat A is made, since a seat E facing the seat A is already reserved at the time when the request to start using the seat A is made. The user determines the seat to use based on usage information of the seat identified by the resource management apparatus 5. Thereby, the resource management system 1 can easily disperse the users.

Further, the resource management apparatus 5 may prohibit reservation of seats other than the identified seat. Thereby, the resource management system 1 can easily disperse the users.

The process executed by the resource management system 1 is described in detail in the following.

Figure 3:
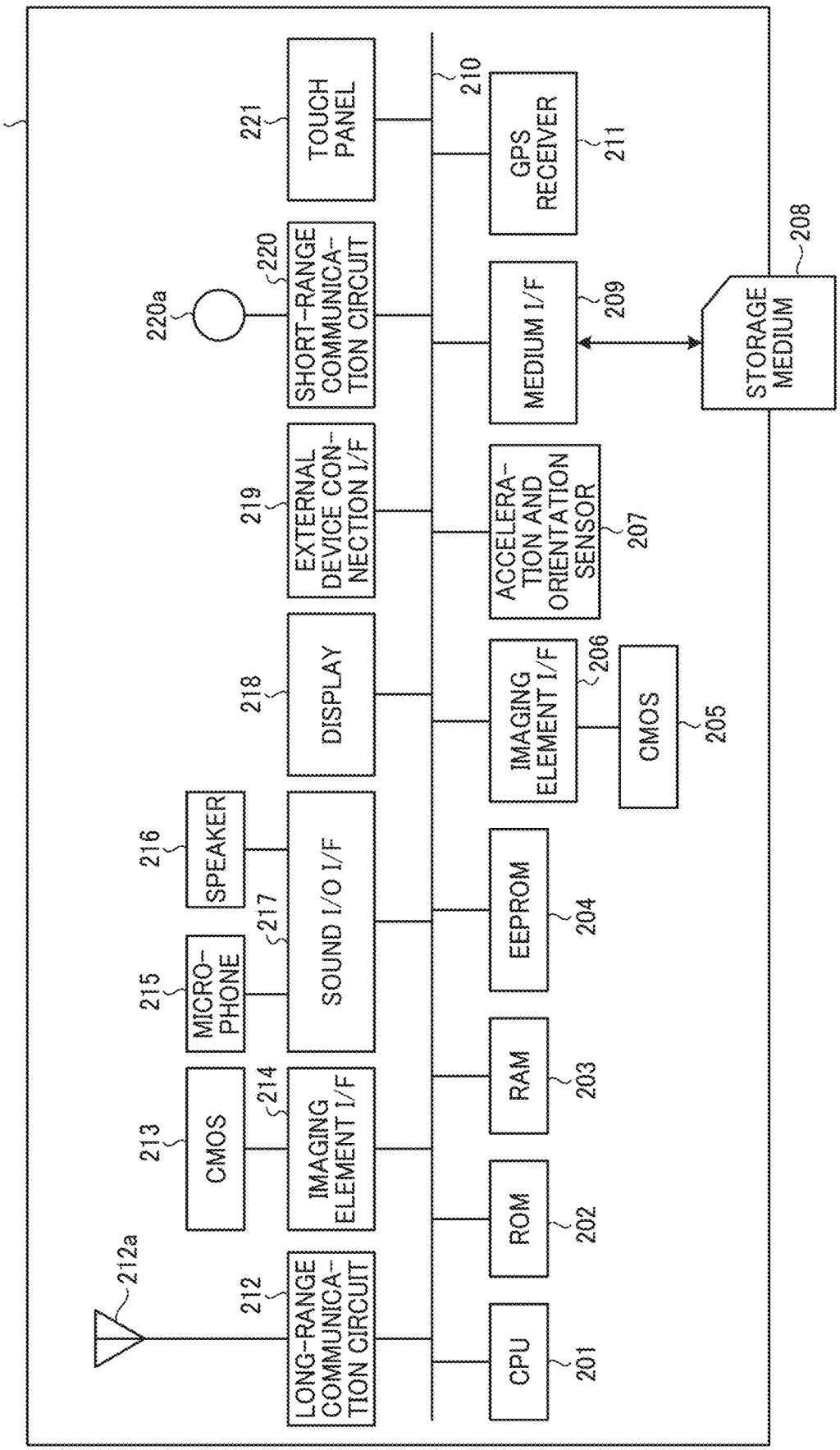
FIG. 3 is a block diagram illustrating a hardware configuration of a communication terminal according to the embodiments of the present disclosure.

FIG. 3 is a block diagram illustrating a hardware configuration of the communication terminal 2 according to the embodiments of the present disclosure. The communication terminal 2 is implemented by, for example, the computer system having the hardware configuration as illustrated in FIG. 3.

The communication terminal 2 illustrated in FIG. 3 is implemented by the computer. The communication terminal 2 includes, for example, a central processing unit (CPU) 201, a read only memory (ROM) 202, a random access memory (RAM) 203, an electrically erasable programmable read-only memory (EEPROM) 204, and a complementary metal oxide semiconductor (CMOS) sensor 205, an imaging element interface (I/F) 206, an acceleration and orientation sensor 207, a medium I/F 209, and a Global Positioning System (GPS) receiver 211.

Among these elements, the CPU 201 controls entire operation of the communication terminal 2. The ROM 202 stores programs such as an Initial Program Loader (IPL) to boot the CPU 201. The RAM 203 is used as a work area for the CPU 201. The EEPROM 204 reads or writes various data according to the control of the CPU 201. The CMOS sensor 205 is a built-in imaging device for acquiring image data or moving image data by imaging a subject under the control of the CPU 201. In alternative to the CMOS sensor, an imaging element such as a charge-coupled device (CCD) sensor may be used as the imaging device. The imaging element I/P 206 is a circuit that controls the drive of the CMOS sensor 205. The acceleration and orientation sensor 207 includes various sensors such as an electromagnetic compass for detecting geomagnetism, a gyrocompass, and an acceleration sensor. The medium I/F 209 reads or writes (stores) data from or to a storage medium 208 such as a flash memory. The GPS receiver 211 receives a GPS signal from a GPS satellite.

Further, the communication terminal 2 includes, for example, a long-range communication circuit 212, an antenna 212a of the long-range communication circuit 212, a CMOS sensor 213, an imaging element VF 214, a microphone 215, a speaker 216, a sound input/output (I/O) I/F 217, a display 218, an external device connection I/F 219, a short-range communication circuit 220, an antenna 220a of the short-range communication circuit 220, and a touch panel 221.

The long-range communication circuit 212 enables communication with other device through the communication network 100. The CMOS sensor 213 is provided on a side of the communication terminal 2 different from the side on which the CMOS sensor 205 is provided. The CMOS sensor 213 is the built-in imaging element for capturing an image of a subject and obtaining image data such as the photograph under the control of the CPU 201. The imaging element I/F 214 is a circuit that controls the drive of the CMOS sensor 213. The microphone 215 is a built-in circuit that converts sound into an electric signal. The microphone 215 acquires voice and sound waves emitted from an external speaker, etc., and acquires information using electrical signals. The speaker 216 is a built-in circuit that generates sound such as music or voice by converting an electric signal into physical vibration. The sound I/O I/F 217 is a circuit that processes sound signal input and output between the microphone 215 and the speaker 216 under the control of the CPU 201. The display 218 is an example of a display device configured to display an image of the object, various icons, etc. Examples of the display 218 include, but not limited to, a liquid crystal display (LCD) and an organic electroluminescence (EL) display. The external device connection I/F 219 is an interface for connecting various external devices. The short-range communication circuit 220 is a communication circuit for short-range wireless communication such as Near Field Communication (NFC) and BLUETOOTH (registered trademark). The touch panel 221 is one example of an input device that allows a user to operate the communication terminal 2 by performing a user operation. Examples of the user operation includes, but are not limited to, operations of pressing, clicking, and Lapping performed on a screen of the display 218. The imaging device such as the CMOS sensor 213, the short-range communication device such as the short-range communication circuit 220, the voice input device such as the microphone 215, and the like are information acquisition devices that acquire resource identification information by, for example, an image such as an image code, wireless communication, or sound waves.

The communication terminal 2 further includes a bus line 210. The bus line 210 is an address bus or a data bus, which electrically connects the elements in FIG. 3 such as the CPU 201.

Any one of the above-described program may be recorded in a file in a format installable or executable on a computer-readable storage medium for distribution. Examples of storage media are Compact Disc Recordable (CD-R), Digital Versatile Disc (DVD), BLU-RAY (registered trademark) Disc, Secure Digital (SD) card, Universal Serial Bus (USB) memory and the like.

In addition, such storage medium may be provided in a form of a program product to users within a certain country or outside that country.

Further, each of the above programs may be stored on a computer connected to a network such as the internet and provided by downloading the program through the network. In addition, each of the above programs may be provided or distributed through a network such as the internet.

For example, the communication terminal 2 implements a resource management method according to the present disclosure by executing the program according to the present disclosure.

Figure 4:
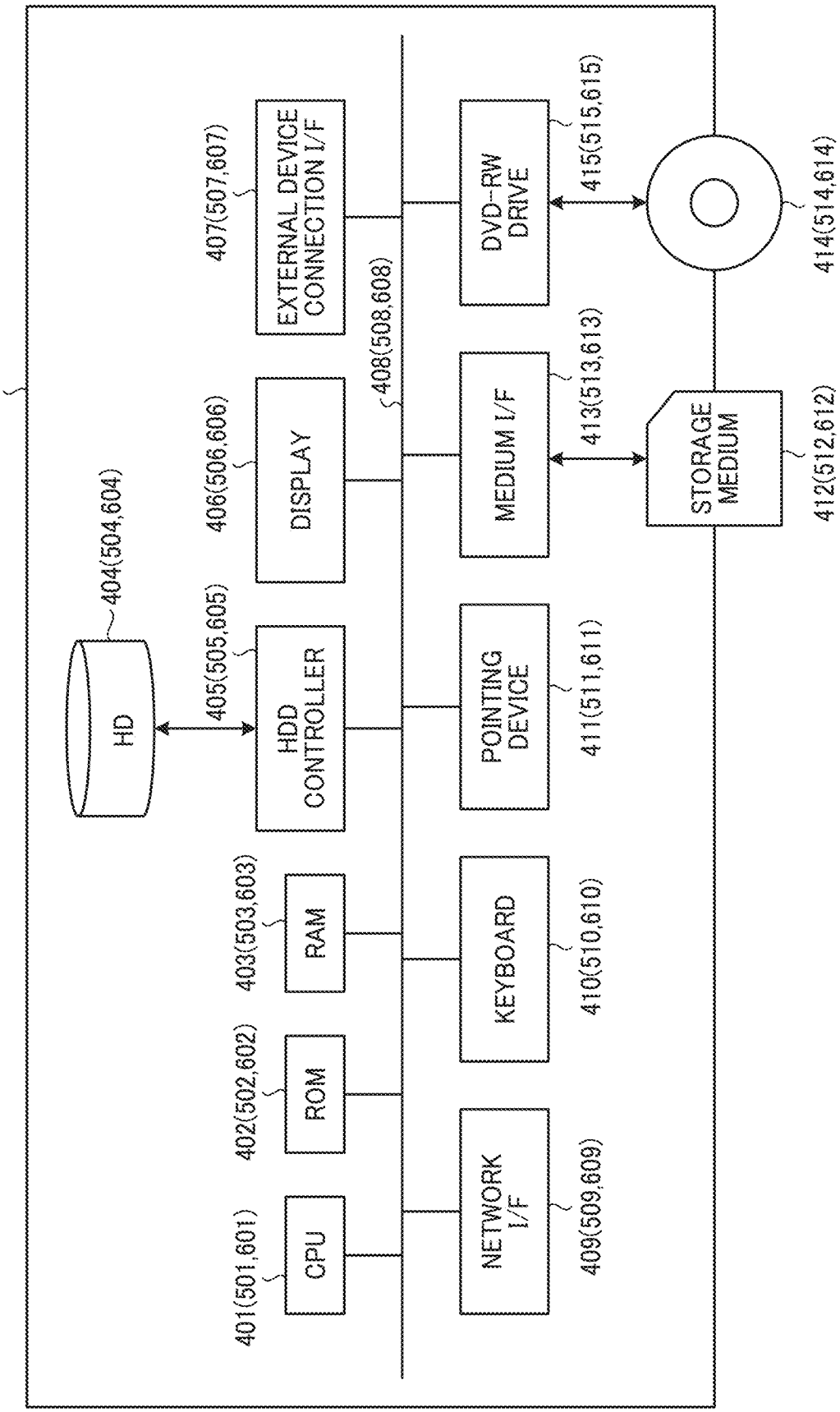
FIG. 4 is a block diagram illustrating a hardware configuration of a reservation management apparatus, a resource management apparatus, and a personal computer (PC) according to the embodiments of the present disclosure.

FIG. 4 is a block diagram illustrating a hardware configuration of a reservation management apparatus, a resource management apparatus, and a PC according to the embodiments of the present disclosure. The reservation management apparatus 4, the resource management apparatus 5, and the PC 6 are implemented by, for example, a computer system having the hardware configuration illustrated in FIG. 4.

The reservation management apparatus 4 illustrated in FIG. 4 is implemented by the computer. The reservation management apparatus 4 includes, for example, a CPU 401, a ROM 402, a RAM 403, a hard disk (HD) 404, a hard disk drive (HDD) controller 405, a display 406, an external device connection I/F 407, a bus line 408, a network I/F 409, a keyboard 410, a pointing device 411, a medium I/F 413, and a Digital Versatile Disc-Rewritable (DVD-RW) drive 415.

The CPU 401 controls entire operation of the computer system. The ROM 402 stores programs such as the IPL to boot the CPU 401. The RAM 403 is used as a work area for the CPU 401. The HD 404 stores various data such as a control program. The HDD controller 405 reads or writes various data from or to the HD 404 under control of the CPU 401. The display 406 displays various information such as a cursor, menu, window, character, or image. The external device connection L/F 407 is an interface that connects the computer system to various external devices. The external device in this case is, for example, the USB memory or a printer. The network I/F 409 is an interface that controls communication of data with an external device through the communication network 110. Examples of the bus line 408 include, but not limited to, an address bus and a data bus, which electrically connects the components such as the CPU 401 illustrated in FIG. 4 with each other.

The keyboard 410 is an example of the input device provided with a plurality of keys that allows the user to input characters, numerals, or various instructions. The pointing device 411 is an example of the input device that allows the user to select or execute a specific instruction, select a target for processing, or move a cursor being displayed. The medium I/F 413 controls reading or writing (storage) of data to a storage medium 412 such as a flash memory. The DVD-RW drive 415 reads and writes various data from and to a DVD-RW 414, which is an example of the removable storage medium. The removable storage medium is not limited to the DVD-RW and may be a digital versatile disc-recordable (DVD-R) or the like.

The resource management apparatus 5 is implemented by the computer. As illustrated in FIG. 4, the resource management apparatus 5 includes a CPU 501, a ROM 502, a RAM 503, an HD 504, an HDD controller 505, a display 506, an external device connection I/F 507, a bus line 508, a network I/F 509, a keyboard 510, a pointing device 511, a medium I/F 513, and a DVD-R W drive 535. Since each of the above components has the same configuration as the CPU 401, ROM 402, RAM 403, HD 404, HDD controller 405, display 406, external device connection I/F 407, bus line 408, network I/F 409, keyboard 410, pointing device 411, medium I/F 413 and DVD-RW drive 415 of the reservation management apparatus 4, the description thereof is omitted.

The PC 6 is implemented by the computer. As illustrated in FIG. 4, the PC 6 includes a CPU 601, a ROM 602, a RAM 603, an HD 604, an HDD controller 605, a display 606, an external device connection I/F 607, a bus line 608, a network I/F 609, a keyboard 610, a pointing device 611, a medium V/F 613, and a DVD-RW drive 615. Since each of the above components has the same configuration as the CPU 401, ROM 402, RAM 403, HD 404, HDD controller 405, display 406, external device connection I/F 407, bus line 408, network I/F 409, keyboard 410, pointing device 411, medium I/F 413 and DVD-RW drive 415 of the reservation management apparatus 4, the description thereof is omitted.

Figure 5:
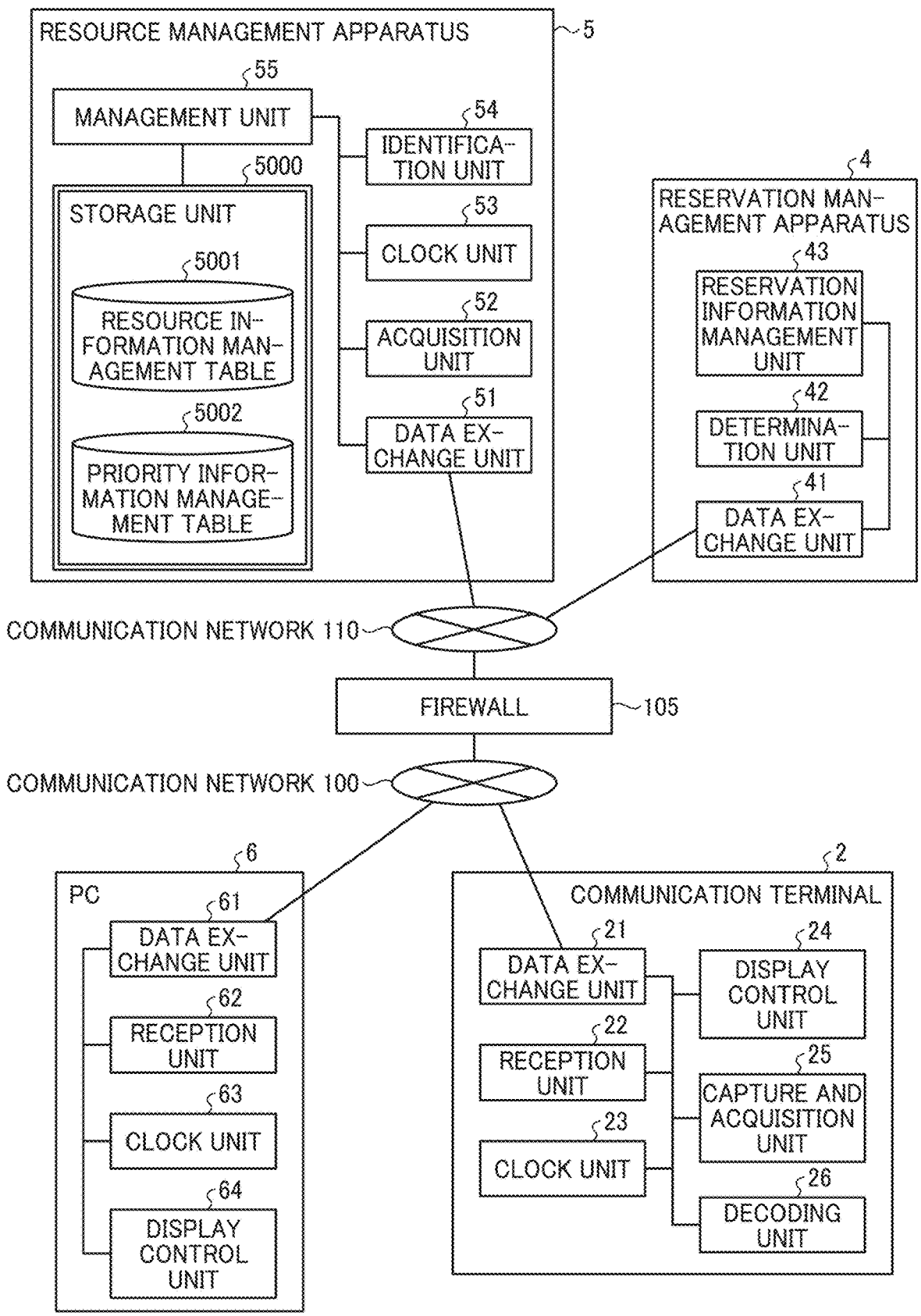
FIG. 5 is a block diagram illustrating an example of a functional configuration of the resource management system according to the embodiments of the present disclosure.

A functional configuration of the resource management system 1 according to the present embodiment is described in the following. FIG. 5 is a block diagram illustrating an example of the functional configuration of the resource management system 1 according to the embodiments of the present disclosure.

As illustrated in FIG. 5, the communication terminal 2 includes a data exchange unit 21, a reception unit 22, a clock unit 23, a display control unit 24, a capture and acquisition unit 25, and a decoding unit 26. Each of these functional units is implemented by the instruction from the CPU 201 according to a program for the communication terminal 2 expanded in the RAM 203 from at least one of the ROM 202 and the EEPROM 204 to any of the components illustrated in FIG. 3.

The data exchange unit 21, reception unit 22, clock unit 23, display control unit 24, capture and acquisition unit 25, and decoding unit 26 illustrated in FIG. 5 are implemented by the program for the communication terminal 2. However, all or part of above components may be implemented by hardware such as an integrated circuit (IC).

A functional configuration of the communication terminal 2 is described in detail. The data exchange unit 21 of the communication terminal 2 illustrated in FIG. 5 is implemented mainly by the processing of the CPU 201, the long-range communication circuit 212 and the external device connection I/F 219 illustrated in FIG. 3 and various data (or information) are transmitted to and received from the resource management apparatus 5 through the communication network 110 implemented outside the firewall 105.

The reception unit 22, which is implemented mainly by the processing of the CPU 201 and the touch panel 221 illustrated in FIG. 3, receives various selections or inputs performed by the user.

The clock unit 23 is implemented mainly by the processing of the CPU 201 illustrated in FIG. 3 and manages time information in the communication terminal 2.

The display control unit 24 is implemented mainly by the processing of the CPU 201 and the display 218 illustrated in FIG. 3 and causes the display 218 to display the captured screen of the QR code 3 and the usage information regarding the use of resources.

The capture and acquisition unit 25 is implemented mainly by the processing of the CPU 201, the CMOS sensor 213, and the imaging element I/F 214 illustrated in FIG. 3 and takes a picture of a subject (one-dimensional code such as a barcode or two-dimensional code such as the QR code 3) attached to the seat, free space, wall, or the like.

The decoding unit 26 is implemented mainly by the processing of the CPU 201 illustrated in FIG. 3 and decodes code information embedded in the QR code 3 or the like acquired by the capture and acquisition unit 25 and obtains identification information related to resources, names of free spaces, and the like.

As illustrated in FIG. 5, the reservation management apparatus 4 includes a data exchange unit 41, a determination unit 42, and a reservation information management unit 43. Each of these functional units is implemented by the instruction from the CPU 401 according to a program for the reservation management apparatus 4 expanded in the RAM 403 from at least one of the ROM 402 and the HD 404 to any of the components illustrated in FIG. 4.

The data exchange unit 41, the determination unit 42, and the reservation information management unit 43 illustrated in FIG. 5 are implemented by the program for the reservation management apparatus 4. However, all or part of these functional units may be implemented by hardware such as the IC.

The functional configuration of the reservation management apparatus 4 is described in detail. The data exchange unit 41 of the reservation management apparatus 4 illustrated in FIG. 5 is implemented mainly by the processing of the CPU 401, the external device connection I/F 407, and the network I/F 409 illustrated in FIG. 4 and transmits and receives various data (or information) to and from the resource management apparatus 5 through the communication network 110 implemented outside the firewall 105.

The determination unit 42 is implemented mainly by the processing of the CPU 401 illustrated in FIG. 4 and makes various determinations in the reservation management apparatus 4.

The reservation information management unit 43, is implemented mainly by the processing performed by the CPU 401 illustrated in FIG. 4 and manages reservation information registered by the user. The reservation information management unit 43 reads various reservation information and transmits the reservation information to the resource management apparatus 5 through the data exchange unit 41 or receives and updates various reservation information from the resource management apparatus 5.

As illustrated in FIG. 5, the resource management apparatus 5 includes a data exchange unit 51, an acquisition unit 52, a clock unit 53, an identification unit 54, and a management unit 55. Each of these functional units is implemented by operation of any of the components illustrated in FIG. 4 according to an instruction from the CPU 501 according to a program for the resource management apparatus 5 expanded in the RAM 503 from at 1') least one of the ROM 502 and the HD 504.

The resource management apparatus 5 further includes a storage unit 5000 implemented in the ROM 502 or the HD 504 illustrated in FIG. 4. The storage unit 5000 stores a resource information management table 5001 and a priority information management table 5002.

The data exchange unit 51, the acquisition unit 52, the clock unit 53, the identification unit 54, and the management unit 55 illustrated in FIG. 5 are implemented by a program for the resource management apparatus 5. However, all or part of these functional units may be implemented by hardware such as the IC.

FIG. 6 is a conceptual diagram illustrating an example of the resource information management table 5001 according to the embodiments of the present disclosure. The resource information management table 5001 as illustrated in FIG. 6 is stored in the storage unit 5000. In the resource information management table 5001, a usage date is set in a tab T, and a resource name, a floor ID, a floor name, usage status, a positional relation, and a number of reservations in the surroundings are stored in association with each resource ID grouped by the tab T.

The resource ID is identification information associated with a free address seat or free space. Further, the resource ID is embedded as information in the QR code 3 attached to the seat, free space, wall, etc. among the resources used by the user.

The resource name is the name of the resource, and is indicated, for example, "Building A 1F-Space 001".

The floor ID is identification information associated with a floor on which the resource is located.

The floor name is the name of the floor, and is indicated, for example, "Building A 1F". Further, the floor is not limited to information related to buildings and floors, but may be information on areas, sections, rooms, etc. in which the resource is located.

The usage status indicates the usage status of the resource. For example, "reserved" is indicated when the resource is reserved, "in use" is indicated when the resource is being used, and "vacant" is indicated when the resource is not being used. The resource is referred to as "secured" when the resource usage status is "in use" or "reserved". The resource is referred to as "not secured" when the resource usage status is "vacant".

This usage status is changed to and registered as "in use" in response to, for example, transmission to the resource management apparatus 5 of the decoded information of the QR code 3 photographed by the communication terminal 2 owned by the user A. Further, when the logout process is performed by the user A, the usage status is changed to and registered as "vacant".

Further, the usage status may be updated based on the information acquired from the reservation management apparatus 4.

The positional relation indicates the resource ID of the resource in the surroundings of each resource and the positional relation with the resource. The positional relation with the resource is managed by, for example, information such as "side", "diagonal", and "opposite", but the information is not limited to these information, and any information that indicates the positional relation of each resource may be used. For example, information such as the distance between each resource may be used.

The positional relation is registered by the administrator or the like who manages the resource management apparatus 5 by operating the PC 6.

The number of reservations in the surroundings is the number of resources in which the usage status of the resources located around each resource is "in use" or "reserved". The number of reservations in the surroundings is calculated and stored based on the usage status of the resource corresponding to the resource ID registered in the positional relation.

Here, the usage status is an example of the reservation information.

Figure 7:
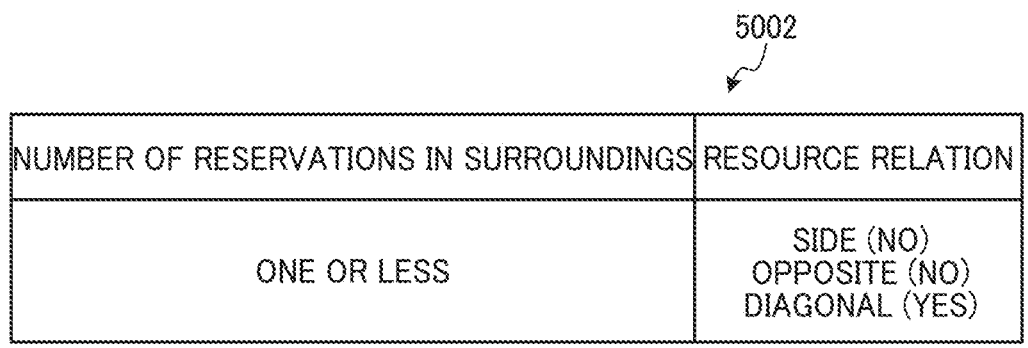
FIG. 7 is a conceptual diagram illustrating an example of a priority information management table according to the embodiments of the present disclosure.

FIG. 7 is a conceptual diagram illustrating an example of the priority information management table 5002 according to the embodiments of the present disclosure. The priority information management table 5002 as illustrated in FIG. 7 is stored in the storage unit 5000. In the priority information management table 5002, priority information used as a threshold value in a resource identification process described below is stored. In FIG. 7, a number of reservations in the surroundings and resource relation are indicated as examples of the priority information.

In the example illustrated in FIG. 7, the number of reservations in the surroundings is one or less, and the resource relation are side (NO), opposite (NO), and diagonal (YES). In the resource identification process described below, a resource whose number of reservations in the surroundings is one or less and whose usage status of the resources in the surroundings is vacant is identified from the resource information management table 5001 of FIG. 6.

The priority information is registered by the administrator or the like who manages the resource management apparatus 5 by operating the PC 6.

The functional configuration of the resource management apparatus 5 is described in detail. The data exchange unit 51 of the resource management apparatus 5 illustrated in FIG. 5 is implemented mainly by the processing of the CPU 501, the external device connection I/F 507, and the network I/F 509 illustrated in FIG. 4 and transmits and receives various data or information to and from another device or terminal (for example, communication terminal 2, reservation management apparatus 4 and PC 6) through the communication network 110.

The data exchange unit 51 of the resource management apparatus 5 functions as, for example, a reception unit that receives a usage start request for starting the use of the resource from the communication terminal 2. Further, when the usage start request is received, the resource usage information is transmitted to the communication terminal 2.

Further, the reservation information of each resource is transmitted to the reservation management apparatus 4.

The acquisition unit 52 is implemented mainly by the processing of the CPU 501 illustrated in FIG. 4 and acquires the reservation information related to the resource from the reservation management apparatus 4 and updates the usage status of the resource information management table 5001.

The clock unit 53, which is implemented mainly by the processing of the CPU 501 illustrated in FIG. 4, manages time information in the resource management apparatus 5.

The identification unit 54 is implemented mainly by the processing of the CPU 501 illustrated in FIG. 4 and identifies the available resource by referring to the resource information management table 5001 in response to receiving the resource usage start request from the communication terminal 2. The identification unit 54 also performs various determinations, judgments, and search processes.

The management unit 55, which is implemented mainly by the processing of the CPU 501 illustrated in FIG. 4, stores various data (or information) in the storage unit 5000 or reads various data (or information) from the storage unit 5000. Further, according to the instruction from the PC 6, registers and updates the resource information management table 5001.

As illustrated in FIG. 5, the PC 6 includes a data exchange unit 61, a reception unit 62, a clock unit 63, and a display control unit 64. These functional units are implemented by operating any of the hardware elements illustrated in FIG. 4 according to an instruction of the CPU 601 according to the program dedicated to the PC 6 expanded to the RAM 603 from at least one of the ROM 602 and the HD 604.

The data exchange unit 61, the reception unit 62, the clock unit 63, and the display control unit 64 illustrated in FIG. 5 are implemented by the program for the PC 6. However, all or part of these functional units may be implemented by hardware such as the IC.

The functional configuration of the PC 6 is described in detail. The data exchange unit 61 of the PC 6 illustrated in FIG. 5 is implemented mainly by the processing of the CPU 601, the external device connection I/F 607, and the network I/F 609 illustrated in FIG. 4 and transmits and receives various information to and from the resource management apparatus 5 through the communication network 100. In the present embodiment, various information (data) such as information on reservation of various resources, resource reservation status of the user who uses the resource, and action schedule are transmitted to and received from the resource management apparatus 5.

The reception unit 62 is implemented mainly by the processing of the CPU 601, the keyboard 610, and the pointing device 611 illustrated in FIG. 4. The reception unit 62 receives various selections or inputs from the administrator. Further, the reception unit 62 may use another input device such as a touch panel.

The clock unit 63 is implemented mainly by the processing of the CPU 601 illustrated in FIG. 3. The clock unit 63 mainly manages the time information of the PC 6.

The display control unit 64 is implemented mainly by the processing of the CPU 601 and the display 606 illustrated in FIG. 3. The display control unit 64 displays, for example, texts and images generated by various data transmitted from the resource management apparatus 5.

The processing or operation in the resource management system 1 according to the present embodiment is described in the following.

Figure 8:
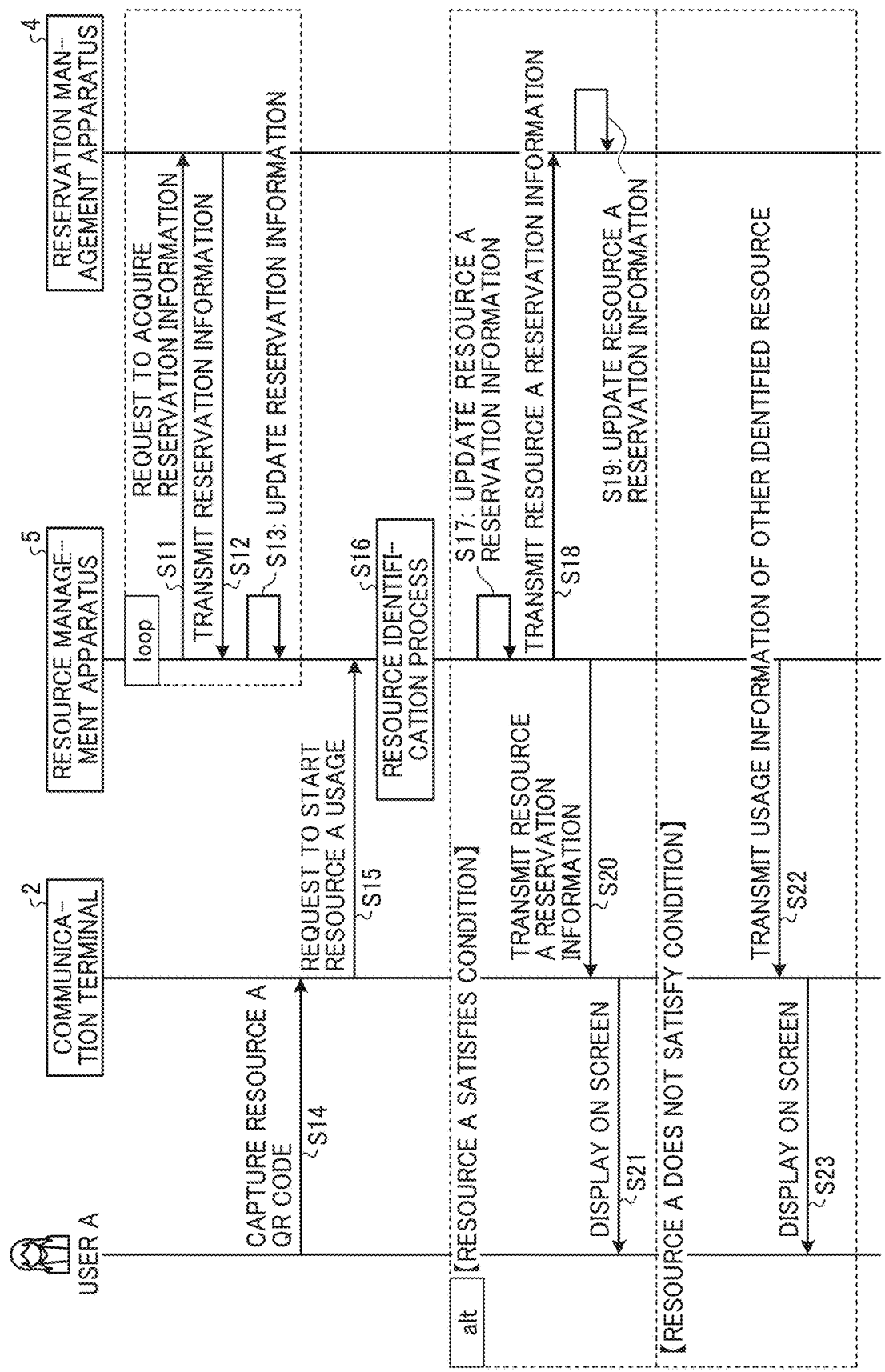
FIG. 8 is a sequence diagram illustrating an example of a process executed by the resource management system according to the embodiments of the present disclosure.

FIG. 8 is a sequence diagram illustrating an example of a process executed by the resource management system according to the embodiments of the present disclosure. In step S11, the data exchange unit 51 of the resource management apparatus 5 transmits an acquisition request to the reservation management apparatus 4 in order to acquire the reservation information of the resource managed by the reservation management apparatus 4.

In step 12, in response to receiving the reservation information acquisition request from the resource management apparatus 5, the reservation management apparatus 4 transmits the reservation information of the resource managed by the reservation information management unit 43 to the resource management apparatus 5.

Accordingly, the acquisition unit 52 of the resource management apparatus 5 acquires the reservation information. In step S13, the management unit 55 of the resource management apparatus 5 updates the usage status of the resource information management table 5001 based on the acquired reservation information.

The processes of steps S11 to S13 may be performed periodically or may be executed in response to the resource usage start request.

In step S14, a user A who wants to start using the resource takes a picture of the QR code 3 (code symbol) attached to a resource A by using the communication terminal 2 owned by the user A.

Subsequently, the decoding unit 26 of the communication terminal 2 decodes the identification information related to the resource embedded in the code information such as the captured QR code 3. In step S15, the data exchange unit 21 of the communication terminal 2 transmits the resource A usage start request and the decoded resource A identification information to the resource management apparatus 5.

In step S16, the identification unit 54 of the resource management apparatus 5 performs the resource identification process described below referring to the resource information management table 5001 and the priority information management table 5002.

Figure 9:
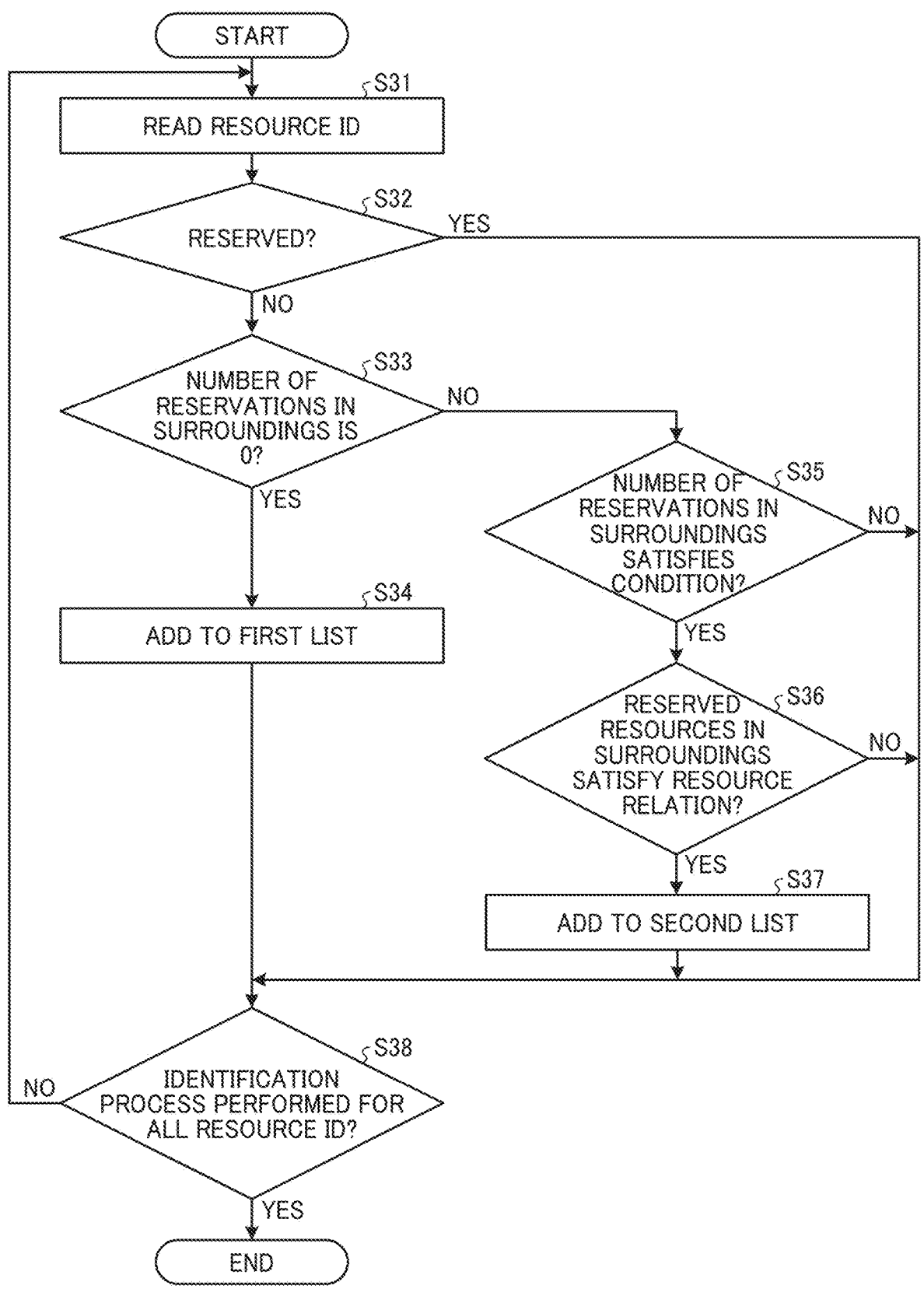
FIG. 9 is a flowchart illustrating an example of a resource identification process according to the embodiments of the present disclosure.

FIG. 9 is a flowchart illustrating an example of the resource identification process according to the embodiments of the present disclosure. In FIG. 9, a resource located on the same floor as the resource A for which the usage start request is made is described as an identification target, but the present disclosure is not limited to such case, and only resource A may be the identification target, or resources located on other floors may be the identification targets.

In step S31, the identification unit 54 of the resource management apparatus reads the resource ID of the resource to be identified from the resource information management table 5001.

In step S32, the identification unit 54 determines whether the usage status of the target resource is "vacant". In the case of YES in step S32, that is, when the usage status of the target resource is "reserved" or "in use", the process proceeds to step S38. That is, when the usage status of the target resource is "reserved" or "in use", the identification unit 54 determines that the target resource is secured.

On the other hand, in the case of NO in step S32, that is, when the usage status of the target resource is "vacant" the identification unit 54 proceeds the process to step S33. That is, when the usage status of the target resource is "vacant", the identification unit 54 determines that the target resource is not secured.

In step S33, the identification unit 54 determines whether the number of reservations around the target resource is 0. That is, the identification unit determines whether all the resources around the target resource are reserved.

In the case of YES in step S33, the identification unit 54 adds the resource ID of the target resource to a first list in step S34, and the process proceeds to step S38. In addition, the resource ID of the resource for which all the resources in the surroundings are not reserved is added to the first list. The identification unit 54 may omit the process of step S33. Alternatively, the identification unit 54 may perform the processing of step S33 after the processing of steps S35 and S36 described below.

On the other hand, in the case of NO in step S33, the identification unit 54 determines whether condition of the number of reservations in the surroundings is satisfied based on the condition of the number of reservations in the surroundings stored in the priority information management table 5002 in step S35.

For example, when the number of reservations in the surroundings is registered as one or less in the priority information management table 5002, the identification unit 54 refers to the resource information management table 5001 and determines whether the number of reservations in the surroundings calculated from the usage status of the resources surroundings the target resource is one or less.

The number of reservations in the surroundings stored in the priority information management table 5002 can be changed as appropriate.

As a result, resources for which at least one of the surroundings resources is not reserved can be identified.

In the case of NO in step S35, the identification unit 54 proceeds the process to step S38.

On the other hand, in the case of YES in step S35, the identification unit 54 determines in step S36, whether the target resource satisfies the condition of the relation between the reserved resources in the surroundings based on the condition of the resource relation stored in the priority information management table 5002.

For example, when the positional relation stored in the priority information management table 5002 is side (NO), opposite (NO), and diagonal (YES), identification unit 54 refers to the resource information management table 5001 and determines whether the relation between the target resource and the resources surroundings the target resource matches the relation registered as YES.

Here, when all the resource relation are registered as YES in the priority information management table 5002, the identification unit 54 may omit the process of step S36.

In addition, when all resource relation are registered as NO in the priority information management table 5002, a resource for which all surroundings resources are not reserved is identified since there is no resource ID to be added to the second list described below.

In the case of YES in step S36, the identification unit 54 adds the resource ID of the target resource to the second list in step S37, and proceeds to step S38. Further, in the second list, resource IDs of resources that satisfy the priorities registered in the priority information management table 5002, although surroundings resources are reserved, are added.

On the other hand, in the case of NO in step S36, the identification unit 54 proceeds to step S38.

In step S38, the identification unit 54 determines whether the identification process has been performed for all the target resource IDs In the case of YES in step S38, the identification unit 54 ends the resource identification process.

On the other hand, in the case of NO in step S38, the identification unit 54 returns to step S31 and performs identification process on the target resource.

In the resource identification process of the present embodiment, the determination is made on the number of reservations in the surroundings and the resource relation but in addition to steps S35 and S36, the determination may be made regarding reserved time zone of the resources.

In this case, the identification unit 54 determines whether the reserved time zone of the target resource ID and the reserved time zone of the resources in the surroundings overlap. The identification unit 54 adds the target resource ID to the second list when the reserved time zones do not overlap and does not add the target resource ID to the second list when the reserved time zones overlap.

Further, the identification unit 54 sets a threshold value in the priority information management table 5002 in advance for determining whether the reserved time zones overlap, determines that the reserved time zones overlap when the set threshold value is equal or exceeded, and determines that the reserved time zones do not overlap when the registered threshold value is not exceeded.

The order of various determination processes is not limited to the above description, and any of the determination may be performed first. Further, another determination process may be performed, without performing a part of the determination process described above. For example, when only determining the reserved time zone, a seat with the resources in the surroundings reserved at the time of usage request may be suggested when it is determined that the reserved time zone do not overlap with the resources in the surroundings.

Returning to FIG. 8, description of the process of the resource management system according to the present embodiment is continued.

When the resource A that is the target of the usage start request is determined to satisfy the condition as a result of the resource identification process and the corresponding resource ID is added to the first list or the second list, the management unit 55 of the resource management apparatus 5 updates the usage status of the resource information management table 5001 to "in use" in step S17.

In step S18, the data exchange unit 51 of the resource management apparatus transmits information to the reservation management apparatus 4 indicating that the usage status of the resource A has been updated to "in use".

In step S19, in response to receiving the information indicating that the usage status of the resource A has been updated to "in use", the reservation information management unit 43 of the reservation management apparatus 4 updates the reservation information of the resource A.

In step S20, the data exchange unit 51 of the resource management apparatus 5 transmits usage information regarding the use of the resource A to the communication terminal 2.

In step S21, the display control unit 24 of the communication terminal 2 displays information on the use of resource on the display 218 of the communication terminal 2 based on the received usage information. For example, the screen 200 as illustrated in FIG. 10 is displayed on the communication terminal 2.

Figure 10B:
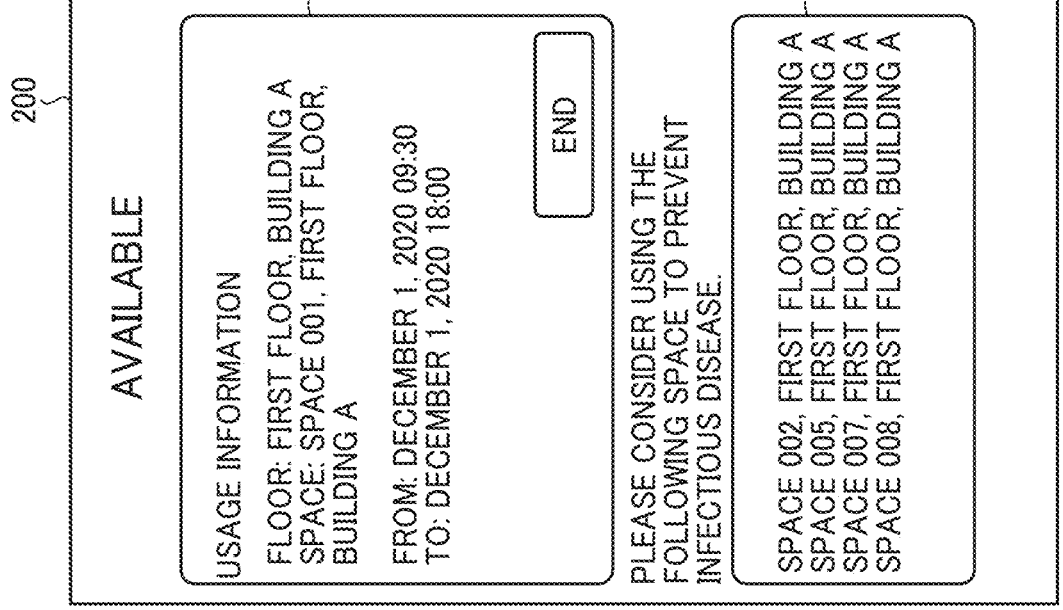
FIGS. 10A and 10B are diagrams illustrating examples of usage information displayed on a communication terminal when a resource is available, according to the embodiments of the present disclosure.
Figure 10A:
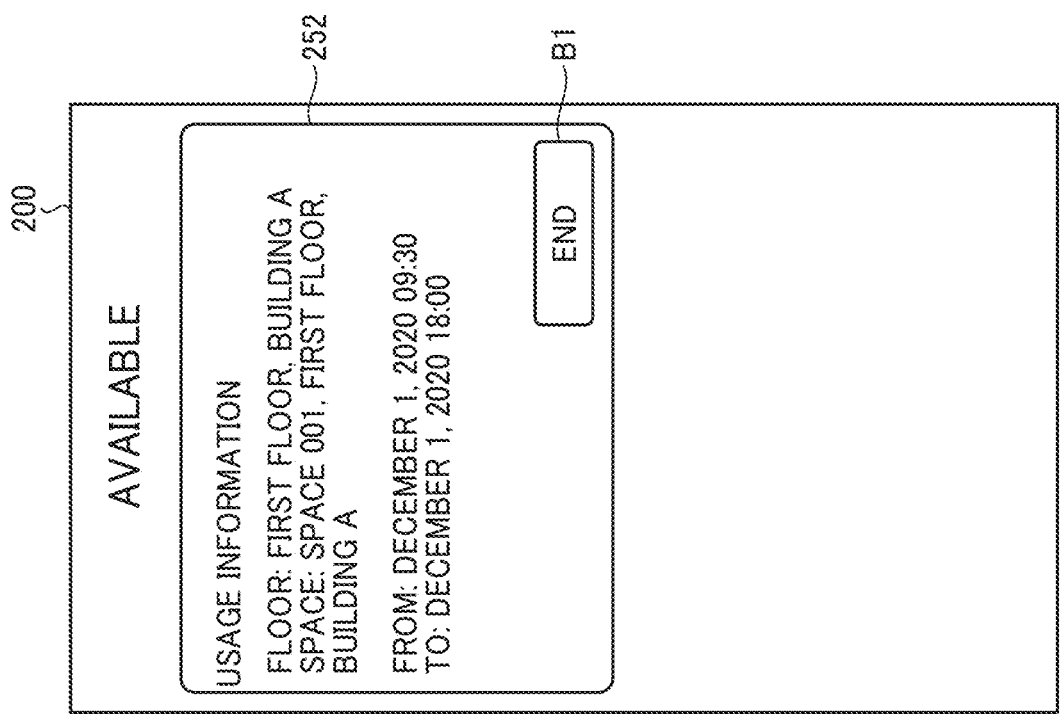

FIGS. 10A and 10B are diagrams illustrating examples of usage information displayed on the communication terminal when the resource is available according to the present embodiment.

In FIG. 10A, a message 252 indicating that the resource is available is displayed on the screen 200 displayed on the communication terminal 2. For example, the message 252 displays the floor name of the resource, the resource name, the start date and time of use, the end date and time of use, and the fact that the resource is being used. Further, by pressing the "end" button BI displayed on the screen 200, the user can end the use of the resource being used.

Accordingly, the users are dispersed because the usage information of the resource is displayed on the screen when the conditions are met.

The screen 200 illustrated in FIG. 10A is a screen displayed on the communication terminal 2 when the resource ID of the resource for which the use start request is made is added to the first list.

FIG. 10B illustrates a message 251 suggesting the use of another resource is displayed on the screen 200 displayed on the communication terminal 2, in addition to the message 252 indicating that the resource is available. For example, in addition to the floor name of the resource, the resource name, the start date and time of use, the end date and time of use, and the message 252 indicating that the resource is being used, the resource name of another resource is displayed as the message 251.

The screen 200 illustrated in FIG. 10A is a screen displayed on the communication terminal 2 when the resource ID of the resource for which the use start request is made is added to the second list. Further, the other resources displayed in the message 251 preferably display only the resources added to the first list but may include the resources added to the second list.

Accordingly, although use of the resources have been successfully determined, the users can be further dispersed by suggesting resources with better conditions.

On the other hand, in response to a determination that the resource A for which the usage start request is made does not satisfy the condition as a result of the resource identification process and the corresponding resource ID is not added to the first list or the second list, the data exchange unit 51 of the resource management apparatus 5 transmits usage information regarding the use of resources other than the resource A to the communication terminal 2 in step S22.

In step S23, the display control unit 24 of the communication terminal 2 displays information on the use of resources on the display 218 of the communication terminal 2 based on the received usage information. For example, the screen 200 as illustrated in FIGS. 11A and 11B is displayed on the display 218 of the communication terminal 2.

Figure 11A:
FIGS. 11A and 11B are diagrams illustrating examples of usage information displayed on a communication terminal when the resource is not available, according to the embodiments of the present disclosure.
Figure 11B:
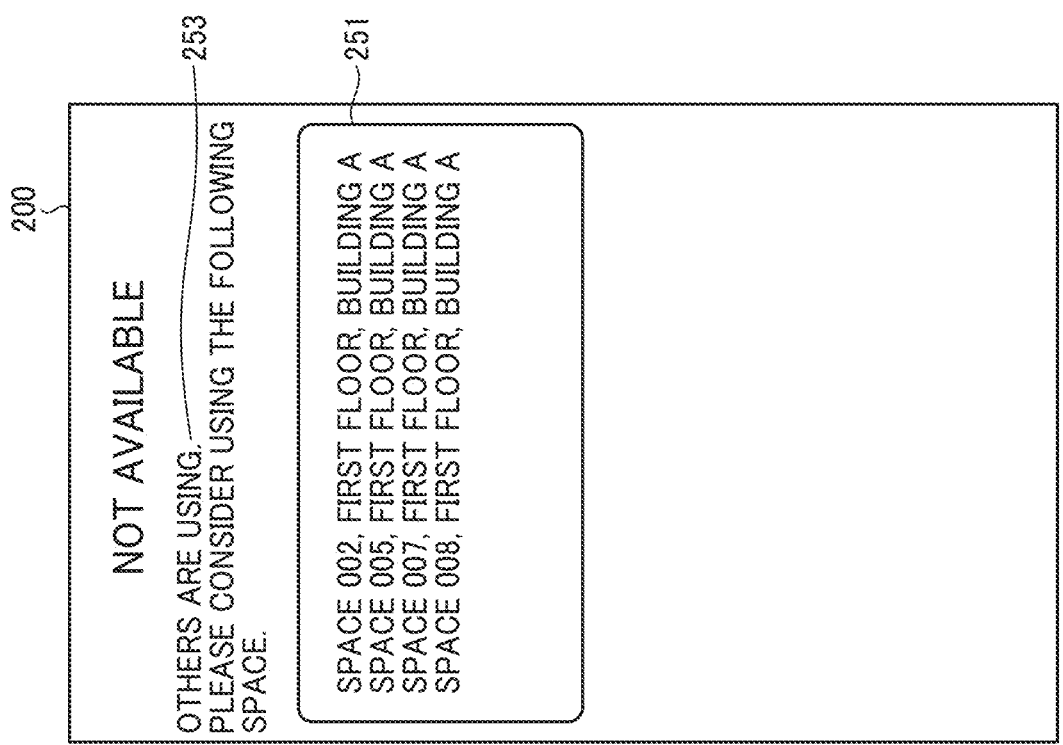

FIGS. 11A and 11B are diagrams illustrating examples of usage information displayed on the communication terminal 2 when a resource is not available, according to the present embodiment.

In FIG. 11A, a message 253 indicating that the resource is not available is displayed on the screen 200 displayed on the communication terminal 2. Further, when there is a resource other than the resource A added to the first list or the second list, a message 251 suggesting the use of the resource added to the first list or the second list is also displayed.

As described above, the screen 200 indicates that the resource is not available because the condition is not satisfied, but it is possible to disperse the users by suggesting the use of other available resources.

The screen 200 illustrated in FIG. 11A is displayed on the communication terminal 2 in response to a determination that the resource ID of the resource for which the start of use request is made is not added to either the first list or the second list.

In FIG. 11B, a message 253 indicating that the resource is not available is displayed on the screen 200 displayed on the communication terminal 2. In addition, since there are no resource added to the first list or the second list related to the resources on the same floor, a message 254 suggesting the use of another floor is displayed.

As described above, since the condition is not satisfied, the screen 200 indicates that the resource is not available, but it is possible to disperse the users by suggesting the use of another floor.

The screen 200 illustrated in FIG. 1I B is displayed on the communication terminal 2 in response to a determination that the resource ID of the resource for which the start of use request is made is not added to either the first list or the second list.

With reference to FIGS. 12A, 12B, 13A, and 13B, an operation by the user such as an administrator making various settings using the PC 6 is described.

FIGS. 12A, 12B, 13A, and 13B illustrate examples of screens of a management site according to the present embodiment.

FIG. 12A is an example of a home screen 600 of the management site according to the present embodiment. The display control unit 64 of the PC 6 displays the home screen 600 of the management site illustrated in FIG. 12A, for making various settings for each resource. On the home screen 600 of the management site for making various settings for each resource illustrated in FIG. 12A, the administrator can switch to a floor list screen T1, a resource list screen T2, a usage history screen T3, and a settings screen T4 from a menu tab at the top of the screen.

FIG. 12B is a diagram illustrating an example of a floor list screen 651 of the management site according to the present embodiment. On the floor list screen 651 illustrated in FIG. 12B, the administrator can create a new floor, link the floor to the map, and the like.

FIG. 13A is an example of a resource list screen 652 of the management site according to the present embodiment. In the resource list screen 652 illustrated in FIG. 13A, the administrator can synchronize and update various information of resources between the reservation management apparatus 4 and the resource management apparatus 5. Further, on the resource list screen 652 illustrated in FIG. 13A, the administrator can edit or delete each resource.

FIG. 13B is a diagram illustrating an example of the resource editing screen 653 of the management site according to the present embodiment. On the resource editing screen 653 illustrated in FIG. 13B, the administrator can register the floor on which the resource is arranged and the positional relation with other resources. By this registration, the PC 6 registers the positional relation in the resource information management table 5001.

Figure 14:
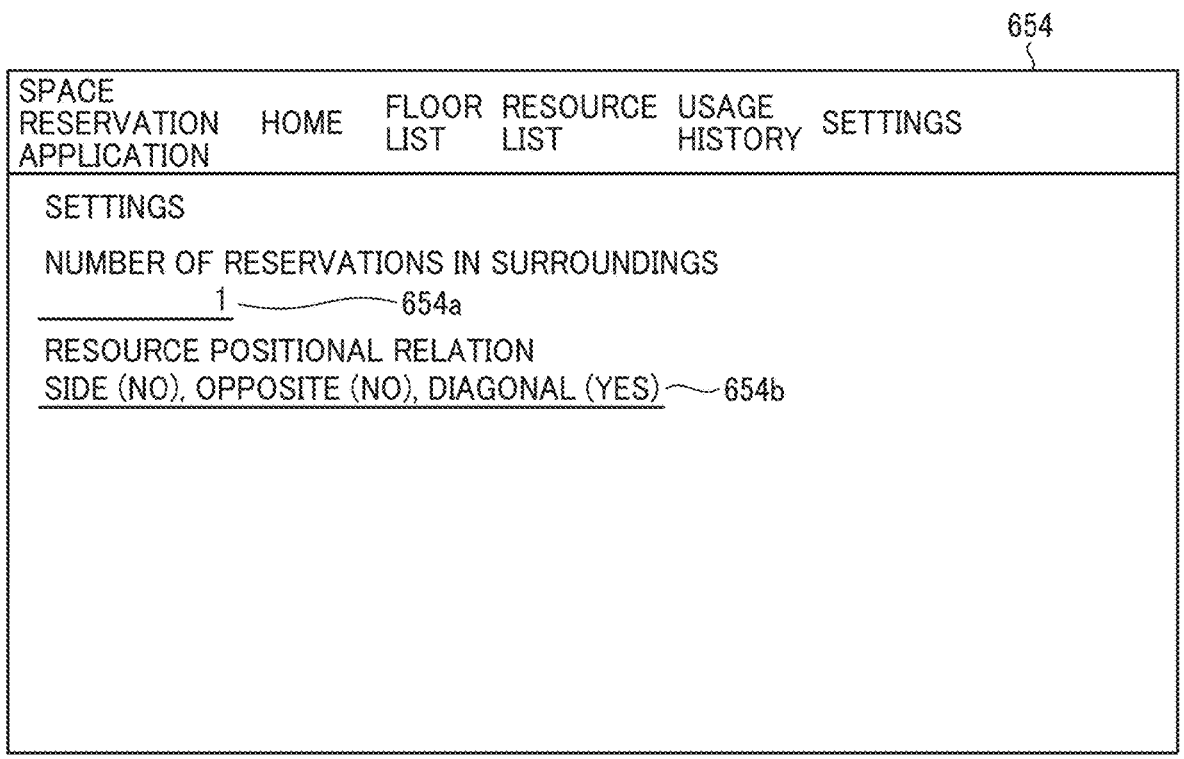
FIG. 14 is a diagram illustrating an example of the management site screen according to the embodiments of the present disclosure.

FIG. 14 is a diagram illustrating an example of a priority information registration screen of the management site according to the present embodiment. On the resource editing screen 654 illustrated in FIG. 14, the administrator registers, edits, or updates the threshold value of the number of reservations in surroundings 654a used in the resource identification process, and priority information such as the resource positional relation 654b. By this registration, the PC 6 registers the number of reservations in surroundings and the resource relation in the priority information management table 5002.

As described above, according to the first embodiment, when the user starts to use the resource, the resource management apparatus 5 determines whether the resource is available from the usage status of the resources in the surroundings referring to the resource information management table 5001 and transmits the usage information regarding the use of the resource to the communication terminal 2. This facilitates the dispersion of users.

Further, the administrator can register the priority information of the priority information management table 5002 using the PC 6 to implement the dispersion of users desired by the administrator. Accordingly, a dispersion effect desired by the administrator when measures against infectious diseases are required, is obtained.

Further, in the case the resource is not available, the resource management apparatus 5 transmits usage information of other available resources, thereby facilitating the dispersion of users and at the same time, facilitate the user to search for available resources.

Hereinafter, a description is given of a second embodiment of the present disclosure.

The second embodiment is different from the first embodiment in that the user requests the start of use of seats on the floor by taking a picture of the QR code 3 attached at the entrance of the floor where a plurality of seats are arranged, by using the camera function of the communication terminal 2 such as a smartphone. Description of the same configurations as those of the first embodiment is omitted in the following description of the second embodiment, and differences from the first embodiment is described.

Figure 15:
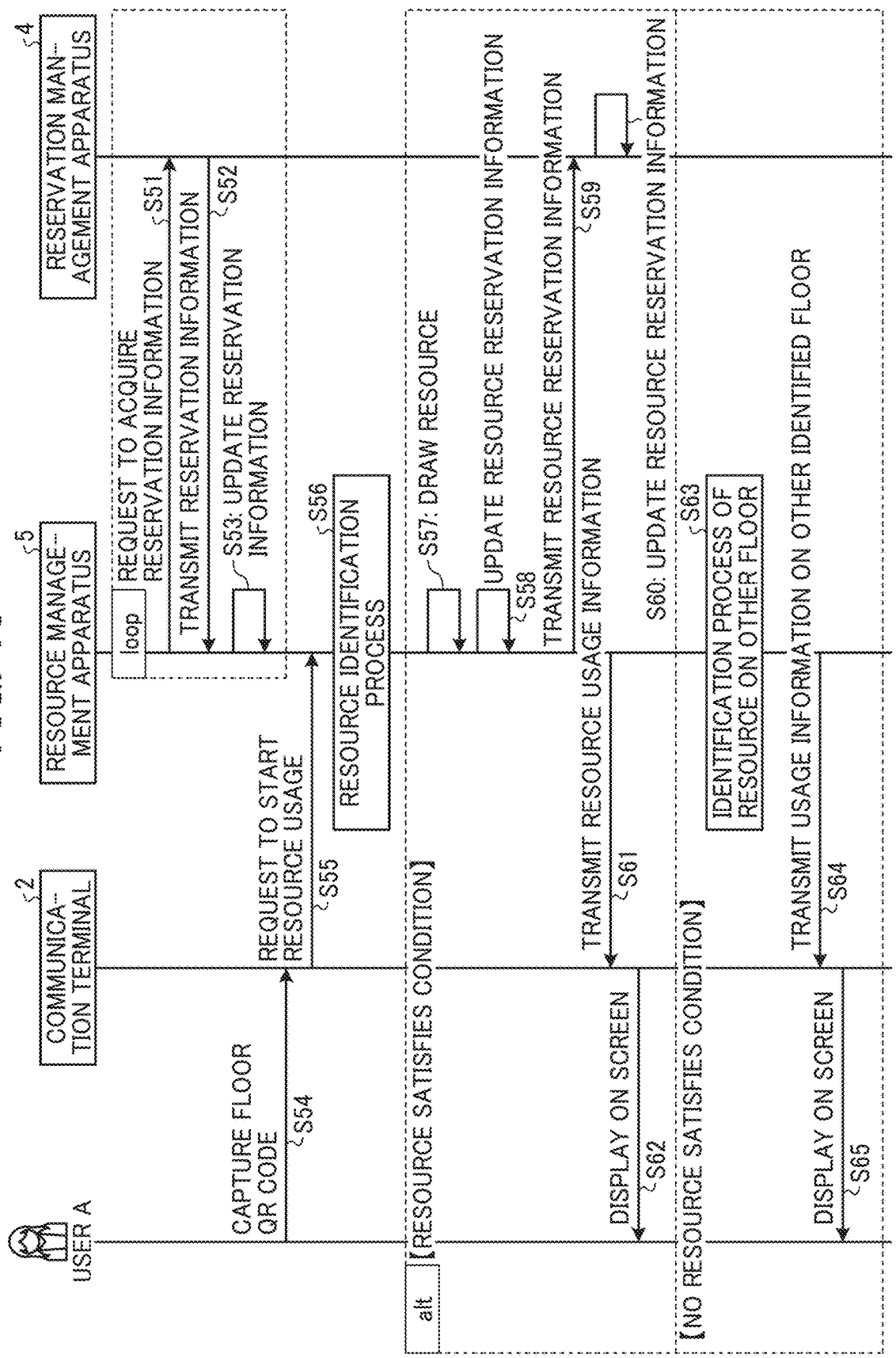
FIG. 15 is a sequence diagram illustrating an example of a process executed by the resource management system according to a second embodiment of the present disclosure.
Figure 16:
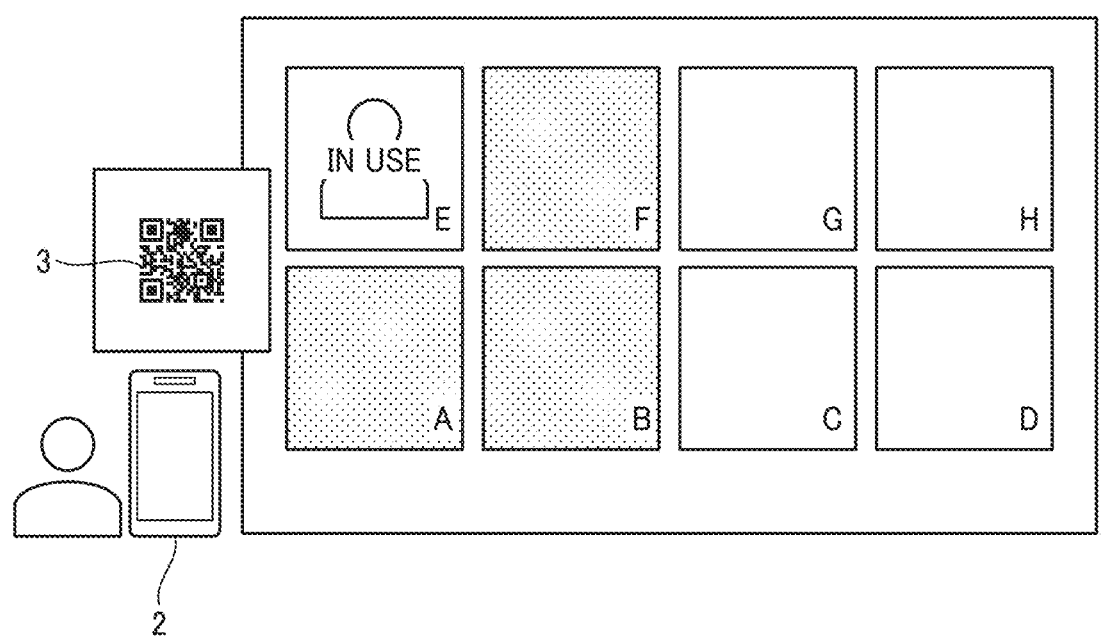
FIG. 16 is a diagram illustrating an example of outline of a process executed by the resource management system according to the second embodiment of the present disclosure.

FIG. 15 is a sequence diagram illustrating an example of a process executed by the resource management system 1 according to the second embodiment, and FIG. 16 is a diagram illustrating an outline example of the process of the resource management system 1 according to the second embodiment.

For example, as illustrated in FIG. 16, the user requests to start using the seat by taking a picture of the QR code 3 attached at the entrance or the like of the floor on which the plurality of seats are arranged, by using the camera function of the communication terminal 2 such as the smartphone. In this example, a seat A is not being used, but a seat E facing the seat A is already reserved. The resource management apparatus 5 identifies, for example, seat C, seat D, seat G, and seat H in which all the surrounding seats are not used. The user determines the seat to use based on usage information of the seat identified by the resource management apparatus 5. Thereby, the resource management system 1 can easily disperse the users.

Further, the resource management apparatus 5 may draw lots from the identified seats and automatically decide the seat to use. As a result, the user can easily start using the seat.

Further, the resource management apparatus 5 may prohibit reservation of seats other than the identified seat. Thereby, the resource management system 1 can easily disperse the users.

The process executed by the resource management system 1 is described in detail in the following.

Since steps S51 to S53 illustrated in FIG. 15 are the same as steps S11 to S13 illustrated in FIG. 8, the description thereof is omitted.

In step S54, the user A who wants to start using the resource uses the communication terminal 2 owned by himself/herself to take the picture of the QR code 3 (code symbol) associated with each floor at the entrance of the floor or the like.

The decoding unit 26 of the communication terminal 2 decodes the identification information related to the resource embedded in the code information such as the captured QR code 3. In step S55, the data exchange unit 21 of the communication terminal 2 transmits a request to start resource usage and the decoded floor identification information to the resource management apparatus 5.

In step S56, the identification unit 54 of the resource management apparatus 5 performs the resource identification process illustrated in FIG. 9 referring to the resource information management table 5001 and the priority information management table 5002 In the resource identification process, the resource located on the floor where the usage start request is made is identified.

In step S57, as a result of the resource identification process, resources satisfying the condition are identified on the floor on which the usage start request is made. The identification unit 54 of the resource management apparatus 5 performs a lottery process.

Here, in the case one or more resource IDs are listed in the first list, the lottery process is performed from the first list, and in the case the resource ID is not listed in the first list, the lottery process is performed from the second list.

In step S58, the management unit 55 of the resource management apparatus 5 updates the usage status of the resource information management table 5001 of the resource identified by the lottery process to "in use".

In step S59, the data exchange unit 51 of the resource management apparatus 5 transmits to the reservation management apparatus 4 information indicating that the usage status of the identified resource has been updated to "in use".

In step S60, in response to receiving the information indicating that the usage status of the identified resource has been updated to "in use", the reservation information management unit 43 of the reservation management apparatus 4 updates the reservation information of the resource.

In step S61, the data exchange unit 51 of the resource management apparatus 5 transmits usage information regarding the use of the identified resource to the communication terminal 2.

In step S62, the display control unit 24 of the communication terminal 2 displays information on the use of resource on the display 218 of the communication terminal 2 based on the received usage information. For example, the screen 200 as illustrated in FIG. 10 is displayed on the communication terminal 2.

The lottery process described above may not be performed, and the data exchange unit 51 of the resource management apparatus 5 may transmit usage information regarding the use of all the identified resources. In this case, for example, the screen 200 as illustrated in FIG. 17A is displayed on the communication terminal 2.

Figure 17A:
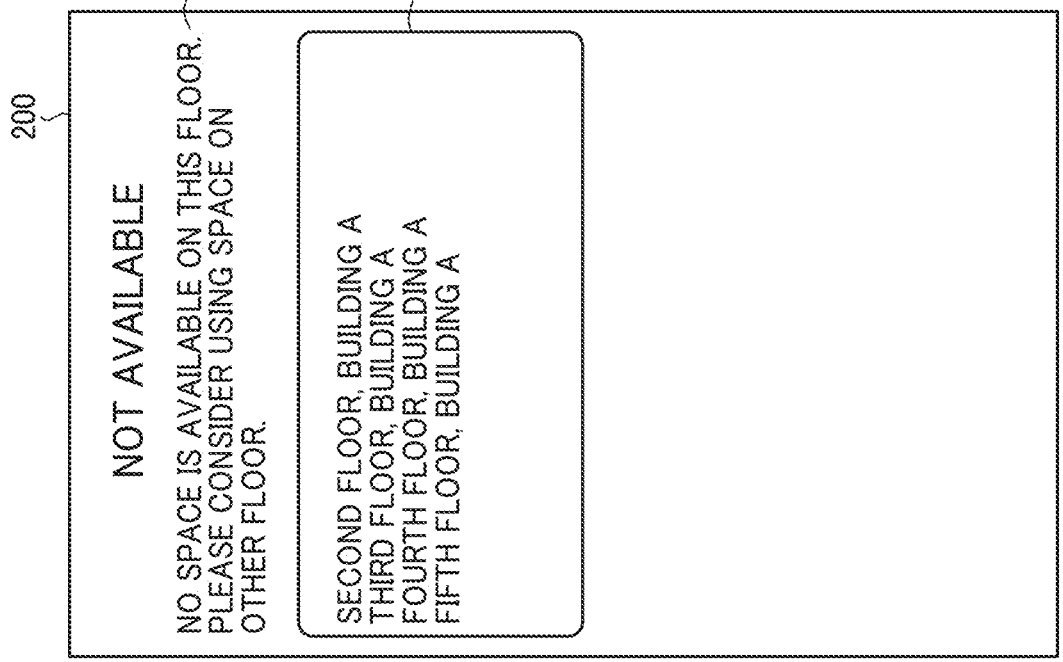
FIGS. 17A and 17B are diagrams illustrating examples of usage information displayed on the communication terminal when suggesting using a resource, according to the second embodiment of the present disclosure.
Figure 17B:
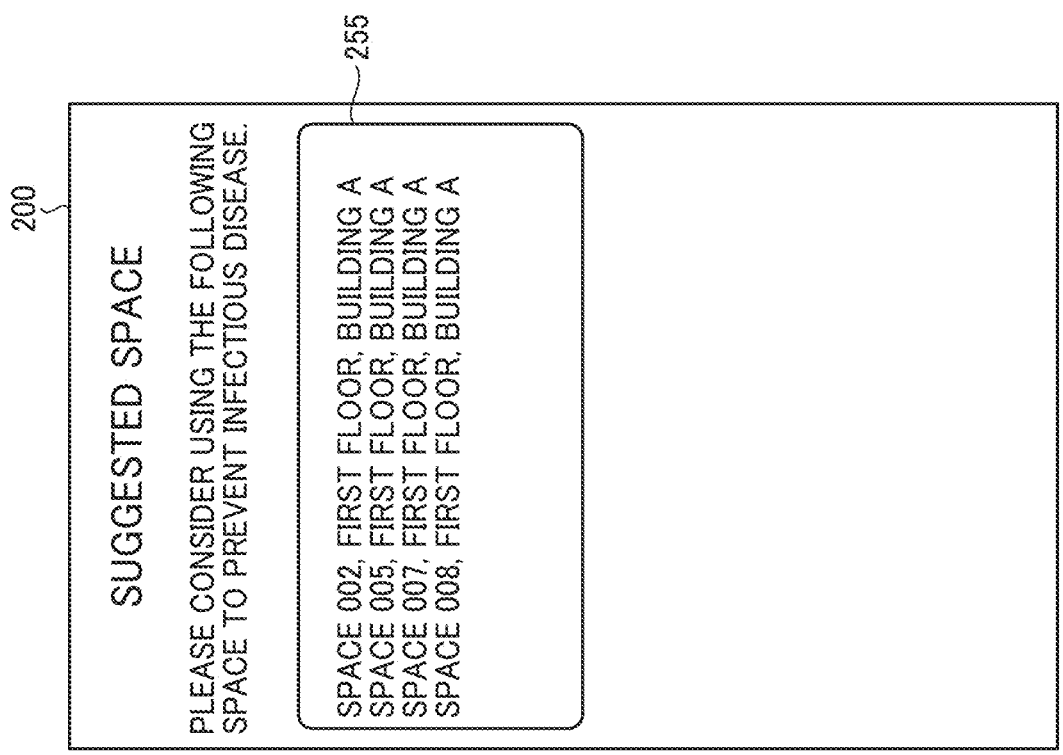

FIGS. 17A and 17B are diagrams illustrating an example of usage information displayed on the communication terminal when suggesting using the resource according to the second embodiment of the present disclosure.

In FIG. 17A, a message 255 suggesting the use of the identified resources is displayed on the screen 200 displayed on the communication terminal 2. For example, the resource name of the identified resource is displayed in the message 255.

Accordingly, the users can be dispersed because the screen that suggests the use of the identified resource is displayed when the conditions are met.

The resource name displayed on the message 255 of the screen 200 illustrated in FIG. 17A may display both the resources added to the first list and the resources added to the second list, or only the resources added to the first list.

On the other hand, in response to a determination as a result of the resource identification process that there is no resource that meets the conditions among the resources on the floor for which the usage start request was made, the identification unit 54 of the resource management apparatus 5 performs the resource identification process illustrated in FIG. 9 for the other floors in step S63.

In step S64, the data exchange unit 51 of the resource management apparatus 5 transmits floor information regarding the use of the floor on which the resource satisfying the condition exists.

In step S65, the display control unit 24 of the communication terminal 2 displays information on the use of resource on the display 218 of the communication terminal 2 based on the received floor information. For example, the screen 200 as illustrated in FIG. 17B is displayed on the display 218 of the communication terminal 2.

FIG. 17B is a diagram illustrating an example of usage information displayed on the communication terminal 2 when suggesting the use of another floor according to the second embodiment.

In FIG. 17B, the screen 200 displayed on the communication terminal 2 displays a message 256 indicating that the resource is not available and a message 257 suggesting the use of another floor.

In this way, the screen 200 indicates that the resource is not available because the conditions were not met, but it is possible to reduce the user's effort by suggesting the use of the floor where other resources are available.

As described above, according to the second embodiment, in response to the request from the user to start using the resource, the resource management apparatus 5 refers to the resource information management table 5001 to identify whether the resource is available from the usage status of surroundings resources and transmits the usage information regarding the use of the resource to the communication terminal 2. Accordingly, the dispersion of users can be facilitated.

Further, in response to a determination that the resource is not available, the resource management apparatus 5 transmits usage information of another floor on which the resource is available. Accordingly, the dispersion of users is facilitated, and at the same time, it is possible to save the trouble of the user searching for available resources.

Hereinafter, a description is given of a third embodiment.

The third embodiment is different from the first embodiment and the second embodiment in that coordinates (X, Y) are registered instead of the positional relation stored in the resource information management table 5001. Hereinafter, in the description of the third embodiment, the description of the same parts as those of the first embodiment and the second embodiment is omitted, and the parts different from the first embodiment and the second embodiment are described.

FIG. 18 is a diagram illustrating an example of the resource information management table 5001 according to the third embodiment of the present disclosure. In the resource information management table 5001 according to the third embodiment, coordinates (X, Y) are stored in place of the positional relation in the resource information management table 5001 illustrated in FIG. 6. The other items are the same with the resource information management table 5001 illustrated in FIG. 6.

The coordinates (X, Y) are information indicating where the target resource located on an image such as a map.

FIG. 19 is a conceptual diagram illustrating an example of the priority information management table 5002 according to the third embodiment of the present disclosure. In the priority information management table 5002 according to the third embodiment, distance is stored in place of the resource relation in the priority information management table 5002 illustrated in FIG. 7.

The distance is information calculated based on the coordinates (X, Y) in which each resource is registered. Here, the threshold value in the resource identification process is registered as the distance. The distance is an example of the distance between the resources.

FIGS. 20A and 20B are diagrams illustrating examples of the management site screen according to the third embodiment of the present disclosure.

FIG. 20A is an example of a resource editing screen 655 of the management site according to the third embodiment. The display control unit 64 of the PC 6 displays the resource editing screen 655 illustrated in FIG. 20A. On the resource editing screen 655 illustrated in FIG. 20A, the administrator can register the floor to which the resource belongs and the coordinates of the resource.

FIG. 20B is a diagram illustrating an example of a coordinate registration and edit screen 656 of the management site according to the third embodiment. The display control unit 64 of the PC 6 displays the coordinate registration and edit screen 656 illustrated in FIG. 20B. On the coordinate registration and edit screen 656 illustrated in FIG. 20B, the administrator displays a map image corresponding to the floor to which the resource belongs and registers a position of the resource in the map (image).

Figure 21:
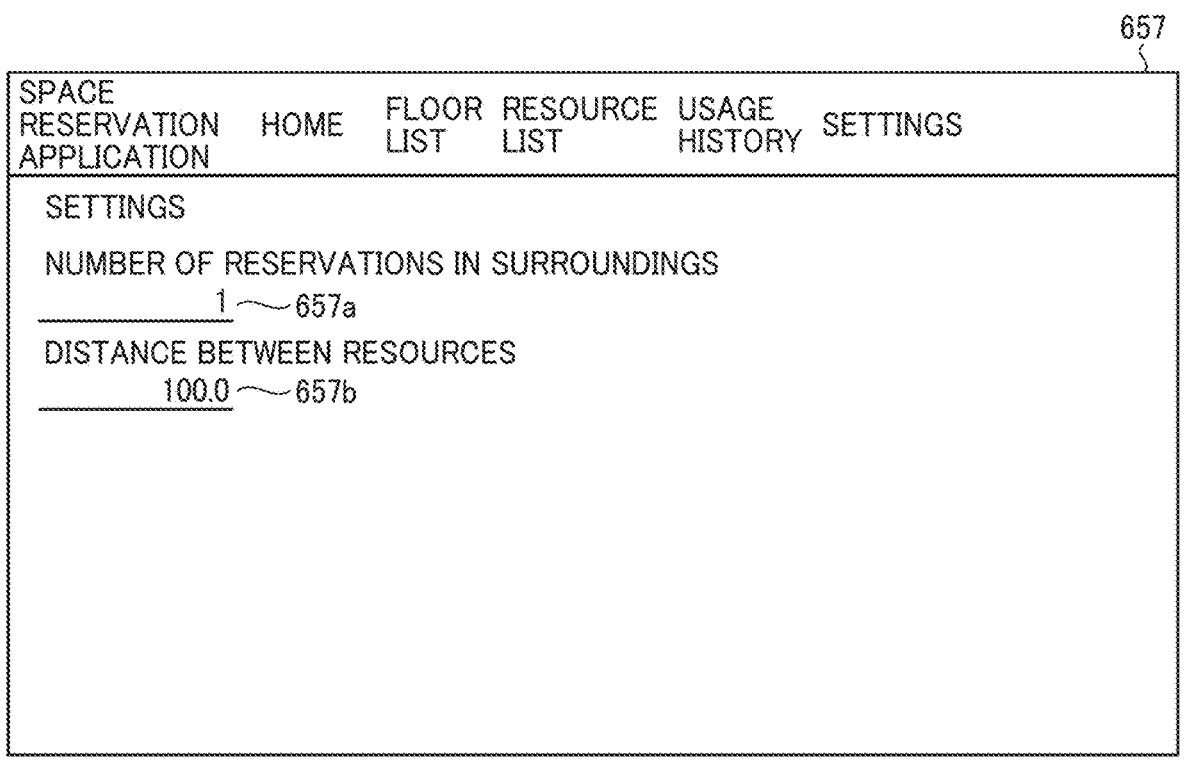
FIG. 21 is a diagram illustrating an example of the management site screen according to the third embodiment of the present disclosure.

FIG. 21 is a diagram illustrating an example of a priority information registration screen of the management site according to the third embodiment. In the resource editing screen 657 illustrated in FIG. 21, the administrator registers, edits and updates the priority information such as the threshold value 657*a* of the number of reservations in the surroundings used in the resource identification process and the threshold value 657*b* of the distance between resources. By this registration, the PC 6 registers the number of reservations in surroundings and the distance between the resources in the priority information management table 5002.

As described above, according to the third embodiment, resource information is managed using coordinates (X, Y) instead of the positional relation in the resource information management table 5001, and resource identification process is performed using the distance calculated based on the coordinates (X, Y). This eliminates the need to register the positional relation for each resource and enables to reduce burden on the administrator.

Further, the administrator can register the priority information in the priority information management table 5002 using the PC 6 to implement the dispersion of users desired by the administrator. Accordingly, a dispersion effect desired by the administrator when measures against infectious diseases are required, is obtained.

The resource management system 1 of the embodiments may also be referred to as a "web service". The web service refers to various services provided by the internet-related technologies. Examples of the web service include various rental services including a meeting room rental service. A system that uses the service is called a usage system.

The resource management system 1 of the embodiments can be divided into the larger number of processing units according to the processing contents. Further, one process can be divided to include a larger number of processes.

In addition, in the resource management system 1 described in the present embodiment, the reservation management apparatus 4 and the resource management apparatus 5 have separate configurations, but the reservation management apparatus 4 and the resource management apparatus 5 may be integrated.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A resource management apparatus comprising:
one or more memories storing a resource information management table in which resource name, usage status, positional relation, and number of reservations in surroundings are in association with each of a plurality of resources, and
circuitry configured to:
receive reservation information of a resource among the plurality of resources;
update usage status of the resource in the resource information management table based on the received reservation information of the resource;

in response to receiving a usage start request of a user for starting a use of the resource from a communication terminal, determine that the resource is not secured based on the usage status of the resource in the resource information management table;

determine whether one or more resources in surroundings are secured based on the positional relation and the reservation information in the resource information management table;

identify the resource as an available resource based on a determination that the one or more resources in the surroundings are not secured;

transmit usage information regarding the use of the available resource to the communication terminal; and manage reservation of the resource by informing the user via the communication terminal whether the resource is available or not based on the usage information regarding the use of the available resource, wherein the circuitry is further configured to:

store in the one or more memories, priority information indicating priority in identifying the available resource; and identify the available resource based on the priority information, wherein the priority information includes the number of reservations in the surroundings and a distance between the resources, and the circuitry is further configured to identify the resource as the available resource based on a determination that the number of reservations in the surroundings is equal to or less than a threshold value and the distance between the resources is equal to or greater than a threshold value.

2. The resource management apparatus of claim 1, wherein
the circuitry is further configured to:
determine whether the reservation information of all resources in the surroundings is secured; and
identify the resource as the available resource based on a determination that the reservation information of all resources in the surroundings are not secured.

3. The resource management apparatus of claim 1, wherein
the priority information includes the number of reservations in the surroundings and a relation between the resources, and the circuitry is further configured to identify the resource as the available resource based on a determination that the number of reservations in the surroundings is equal to or less than the threshold value and the resource relation satisfies condition.

4. The resource management apparatus of claim 1, wherein
the usage start request is made by reading a code symbol associated with the resource, and
the circuitry is further configured to determine whether the resource is available based on the reservation information of a first resource associated with the code symbol and reservation information of a second resource located in surroundings of the first resource.

5. The resource management apparatus of claim 1, wherein
the circuitry is further configured to:
store in the one or more memories, floor information indicating a floor on which the resource is located;
based on a determination that the resource is not available, identify a floor on which the available resource is located based on the reservation information of the resource located on other floor and the positional relation; and
transmit the floor information of the identified floor to the communication terminal.

6. The resource management apparatus of claim 5, wherein
the usage start request is made by reading a code symbol associated with the floor on which each resource is located, and the circuitry is further configured to identify the available resource based on the reservation information of the resource located on the floor associated with the code symbol and the positional relation.

7. A resource management system comprising:
a communication terminal; and
a resource management apparatus to manage a resource, the resource management apparatus including one or more memories storing a resource information management table in which resource name, usage status, positional relation, and number of reservations in surroundings are in association with each of a plurality of resources, and
circuitry configured to:
receive reservation information of the resource among the plurality of resources;
update the usage status of the resource in the resource information management table based on the received reservation information of the resource;
in response to receiving a usage start request of a user for starting a use of the resource from the communication terminal, determine that the resource is not secured based on the usage status of the resource in the resource information management table;
determine whether one or more resources in surroundings is secured based on the reservation information and the positional relation in the resource information management table;
identify the resource as an available resource based on a determination that the one or more resources in the surroundings are not secured;
transmit usage information regarding the use of the available resource to the communication terminal;
the communication terminal including circuitry configured to display on a display, the usage information received from the resource management apparatus; and
manage reservation of the resource by informing the user via the communication terminal whether the resource is available or not based on the usage information regarding the use of the available resource,
wherein the circuitry is further configured to:
store in the one or more memories, priority information indicating priority in identifying the available resource; and
identify the available resource based on the priority information,
wherein the priority information includes the number of reservations in the surroundings and a distance between the resources, and the circuitry is further configured to identify the resource as the available resource based on a determination that the number of reservations in the surroundings is equal to or less than a threshold value and the distance between the resources is equal to or greater than a threshold value.

8. A resource management method executed by a resource management apparatus, the method comprising:
storing in one or more memories, a resource information management table in which resource name, usage status, positional relation, and number of reservations in surroundings are in association with each of a plurality of resources;

receiving reservation information of a resource among the plurality of resources;

updating the usage status of the resource in the resource information management table based on the received reservation information of the resource;

in response to receiving a usage start request of a user for starting a use of the resource from a communication terminal, determine that the resource is not secured based on the usage status of the resource in the resource information management table;

determining whether one or more resources in surroundings are secured based on the reservation information and the positional relation;

identifying the resource as an available resource based on a determination that the one or more resources in the surroundings are not secured;

storing in the one or more memories, priority information indicating priority in identifying the available resource; and identifying the available resource based on the priority information, transmitting usage information regarding the use of the available resource to the communication terminal; and manage reservation of the resource by informing the user via the communication terminal whether the resource is available or not based on the usage information regarding the use of the available resource, wherein the priority information includes the number of reservations in the surroundings and a distance between the resources, and the circuitry is further configured to identify the resource as the available resource based on a determination that the number of reservations in the surroundings is equal to or less than a threshold value and the distance between the resources is equal to or greater than a threshold value.

* * * * *